(12) United States Patent
Ji et al.

(10) Patent No.: US 11,933,645 B2
(45) Date of Patent: Mar. 19, 2024

(54) METHODS AND APPARATUS TO DETERMINE A POSITION OF A ROTATABLE SHAFT OF A MOTOR

(71) Applicant: TEXAS INSTRUMENTS INCORPORATED, Dallas, TX (US)

(72) Inventors: Rujun Ji, Shanghai (CN); Jun Zhang, Shanghai (CN); Lichang Cheng, Shanghai (CN); Kangcheng Xu, Shanghai (CN)

(73) Assignee: Texas Instruments Incorporated, Dallas, TX (US)

( * ) Notice: Subject to any disclaimer, the term of this patent is extended or adjusted under 35 U.S.C. 154(b) by 324 days.

(21) Appl. No.: 17/346,472

(22) Filed: Jun. 14, 2021

(65) Prior Publication Data

US 2021/0302209 A1 Sep. 30, 2021

Related U.S. Application Data

(63) Continuation of application No. 15/704,292, filed on Sep. 14, 2017, now Pat. No. 11,060,889, which is a
(Continued)

(51) Int. Cl.
*G01D 5/24* (2006.01)
*G01D 5/241* (2006.01)
*H02K 11/21* (2016.01)

(52) U.S. Cl.
CPC ......... *G01D 5/2403* (2021.05); *G01D 5/2415* (2013.01); *H02K 11/21* (2016.01); *H02K 2211/03* (2013.01)

(58) Field of Classification Search
CPC .................................................... G01R 27/26
(Continued)

(56) References Cited

U.S. PATENT DOCUMENTS 3,784,888 A * 1/1974 Geiersbach ............ H02K 29/06
318/810
4,550,221 A 10/1985 Mabusth
(Continued)

FOREIGN PATENT DOCUMENTS

CN 101206126 6/2008
CN 101556170 10/2009
(Continued)

OTHER PUBLICATIONS

Cypress Semiconductor, "AN64846 Getting Started with CapSense", Document No. 001-64846, Copyright 2010-2016, 127 pages.
(Continued)

*Primary Examiner* — Vincent Q Nguyen
(74) *Attorney, Agent, or Firm* — Michael T. Gabrik; Frank D. Cimino

(57) ABSTRACT

Methods and apparatus to determine a position of a rotatable shaft of a motor are disclosed. An example apparatus to determine a position of a rotatable shaft of a motor includes a sensor printed circuit board (PCB) structured to be mounted to a motor, the sensor PCB including a plurality of capacitive sensors, the plurality of capacitive sensors having respective ones of a plurality of capacitances that independently change as a conductor moves relative to the sensor PCB in conjunction with a rotatable shaft of the motor during an operation of the motor, and a controller electrically coupled to the sensor PCB, the controller configured to determine a position of the rotatable shaft based on the plurality of capacitances.

27 Claims, 16 Drawing Sheets

Related U.S. Application Data continuation of application No. PCT/CN2017/084168, filed on May 12, 2017.

(58) Field of Classification Search
USPC .................................................. 324/660–664
See application file for complete search history.

(56) References Cited

U.S. PATENT DOCUMENTS

| | | | |
|---|---|---|---|
| 4,779,094 | A | 10/1988 | Lee et al. |
| 4,788,422 | A | 11/1988 | Fujiwara |
| 4,851,835 | A | 7/1989 | Krumholz et al. |
| 4,862,752 | A | 9/1989 | Hoyt |
| 5,239,307 | A | 8/1993 | Andermo |
| 5,311,666 | A | 5/1994 | Jacobsen |
| 5,880,683 | A | 3/1999 | Brandestini |
| 6,170,162 | B1 | 1/2001 | Jacobsen et al. |
| 6,218,803 | B1 | 4/2001 | Montagu et al. |
| 7,129,935 | B2 | 10/2006 | Mackey |
| 8,059,015 | B2 | 11/2011 | Hua et al. |
| 8,089,288 | B1 | 1/2012 | Maharita |
| 11,060,889 | B2 | 7/2021 | Ji et al. |
| 2002/0017136 | A1* | 2/2002 | Morimura .......... G06V 40/1306 |
| | | | 73/514.32 |
| 2005/0092108 | A1 | 5/2005 | Andermo |
| 2006/0176189 | A1 | 8/2006 | Bar-On |
| 2007/0261258 | A1 | 11/2007 | Ahn et al. |
| 2008/0117731 | A1 | 5/2008 | Moro et al. |
| 2008/0295801 | A1* | 12/2008 | Zanotti .................. B62K 11/14 |
| | | | 123/361 |
| 2010/0097078 | A1 | 4/2010 | Philipp et al. |
| 2010/0148801 | A1 | 6/2010 | Uchida et al. |
| 2010/0225309 | A1 | 9/2010 | Takahashi et al. |
| 2010/0301840 | A1 | 12/2010 | Filatov |
| 2012/0105080 | A1 | 5/2012 | Iwasawa et al. |
| 2012/0278033 | A1 | 11/2012 | Bucher et al. |
| 2013/0120053 | A1 | 5/2013 | Mei et al. |
| 2014/0368222 | A1 | 12/2014 | Curtis |
| 2015/0355607 | A1 | 12/2015 | Nagaoka |
| 2016/0097799 | A1* | 4/2016 | Rocher ................. G01L 27/002 |
| | | | 324/537 |
| 2016/0147582 | A1 | 5/2016 | Karakulak et al. |
| 2016/0148702 | A1 | 5/2016 | Karakulak et al. |
| 2016/0178402 | A1* | 6/2016 | Klopfenstein ....... G01D 5/2412 |
| | | | 368/80 |

FOREIGN PATENT DOCUMENTS

| | | |
|---|---|---|
| CN | 102798405 | 11/2012 |
| CN | 103528605 | 11/2012 |
| CN | 103124896 | 5/2013 |
| CN | 104280053 | 1/2015 |
| CN | 105393090 A | 3/2016 |
| CN | 106415190 A | 2/2017 |
| CN | 206146435 U | 5/2017 |
| CN | PCT/CN2017/084168 | 5/2017 |
| EP | 1680653 A1 | 6/2006 |
| JP | 2005061964 | 3/2005 |
| WO | WO2005045387 A1 | 11/2003 |

OTHER PUBLICATIONS

Madaan et al., "Capacitive Sensing Made Easy, Part 1: An Introduction to Different Capacitive Sensing Technologies", Cypress Semiconductor Corp., Apr. 2012, 8 pages.

"Definition of an Encoder", accessed on Mar. 1, 2017, [http://www.bierlemartin.de/hengstler/training/encdef.htm], 5 pages.

Simpkins et al., "Position Estimation and Control of Compact BLDC Motors Based on Analog Linear Hall Effect Sensors", 2010 American Control Conference, Jun. 30-Jul. 2, 2010.

Texas Instruments, "PCB-Based Capacitive Touch Sensing With MSP430", Application Report, Jun. 2007, 25 pages.

Pradhyum Ramkumar, "Capacitive touch and MSP microcontrollers", Texas Instruments, Nov. 2015, 5 pages.

Texas Instruments, "TI Designs CapTIvate E-Lock Design Guide", Nov. 2016, 20 pages.

Notice of Allowance dated Jul. 25, 2022, U.S. Appl. No. 16/868,596, filed May 7, 2020, 9 pages.

* cited by examiner

1000

| IN 1 | IN 2 | ANGLE |
|---|---|---|
| 1 | 6 | 7 |
| 1 | 8 | 13 |
| 1 | A | 20 |
| 2 | 4 | 27 |
| 2 | 5 | 33 |
| 2 | 8 | 40 |
| 2 | 9 | 47 |
| 3 | 4 | 53 |
| 3 | 5 | 60 |
| 3 | 6 | 67 |
| 3 | A | 73 |
| 4 | 8 | 80 |
| 4 | 9 | 87 |
| 5 | 6 | 93 |
| 5 | B | 100 |
| 6 | 8 | 107 |
| 2 | 3 | 113 |
| 4 | 5 | 120 |
| 6 | 7 | 127 |
| 8 | 9 | 133 |
| A | B | 140 |
| 4 | 6 | 147 |
| 5 | 7 | 153 |
| 8 | A | 160 |
| 9 | B | 167 |
| 4 | 7 | 173 |
| 5 | 8 | 180 |

| IN 1 | IN 2 | ANGLE |
|---|---|---|
| 6 | 9 | 187 |
| A | C | 193 |
| 8 | B | 200 |
| 9 | A | 207 |
| 6 | A | 213 |
| B | C | 220 |
| 8 | C | 227 |
| 1 | 3 | 233 |
| 1 | 5 | 240 |
| 1 | 7 | 247 |
| 1 | 9 | 253 |
| 1 | B | 260 |
| 2 | 6 | 267 |
| 2 | 7 | 273 |
| 2 | A | 280 |
| 2 | B | 287 |
| 3 | 7 | 293 |
| 3 | 8 | 300 |
| 9 | 3 | 307 |
| 3 | C | 313 |
| 4 | B | 320 |
| A | 4 | 327 |
| 5 | A | 333 |
| 5 | C | 340 |
| 6 | C | 347 |
| 1 | 2 | 353 |
| 1 | 4 | 360 |

1010 → row (3, A, 73)
1012 → row (4, 8, 80)

FIG. 10

METHODS AND APPARATUS TO DETERMINE A POSITION OF A ROTATABLE SHAFT OF A MOTOR

CROSS-REFERENCE TO RELATED APPLICATIONS

This application is a continuation of U.S. patent application Ser. No. 15/704,292 filed on Sep. 14, 2017, which is incorporated herein by reference in its entirety.

FIELD OF THE DISCLOSURE

The present disclosure relates generally to motors and, more particularly, to methods and apparatus to determine a position of a rotatable shaft of a motor.

BACKGROUND

Motors convert supplied energy (e.g., electrical, hydro, natural gas, propane, gasoline, diesel, etc.) into mechanical energy in the form of, for example, a rotating shaft.

BRIEF DESCRIPTION OF THE DRAWINGS

FIG. 10 is an example table that may be used to determine the position of a motor using the example sensor PCB of FIG. 8 and the example conductor PCB of FIG. 9.

SUMMARY

Figure 1:
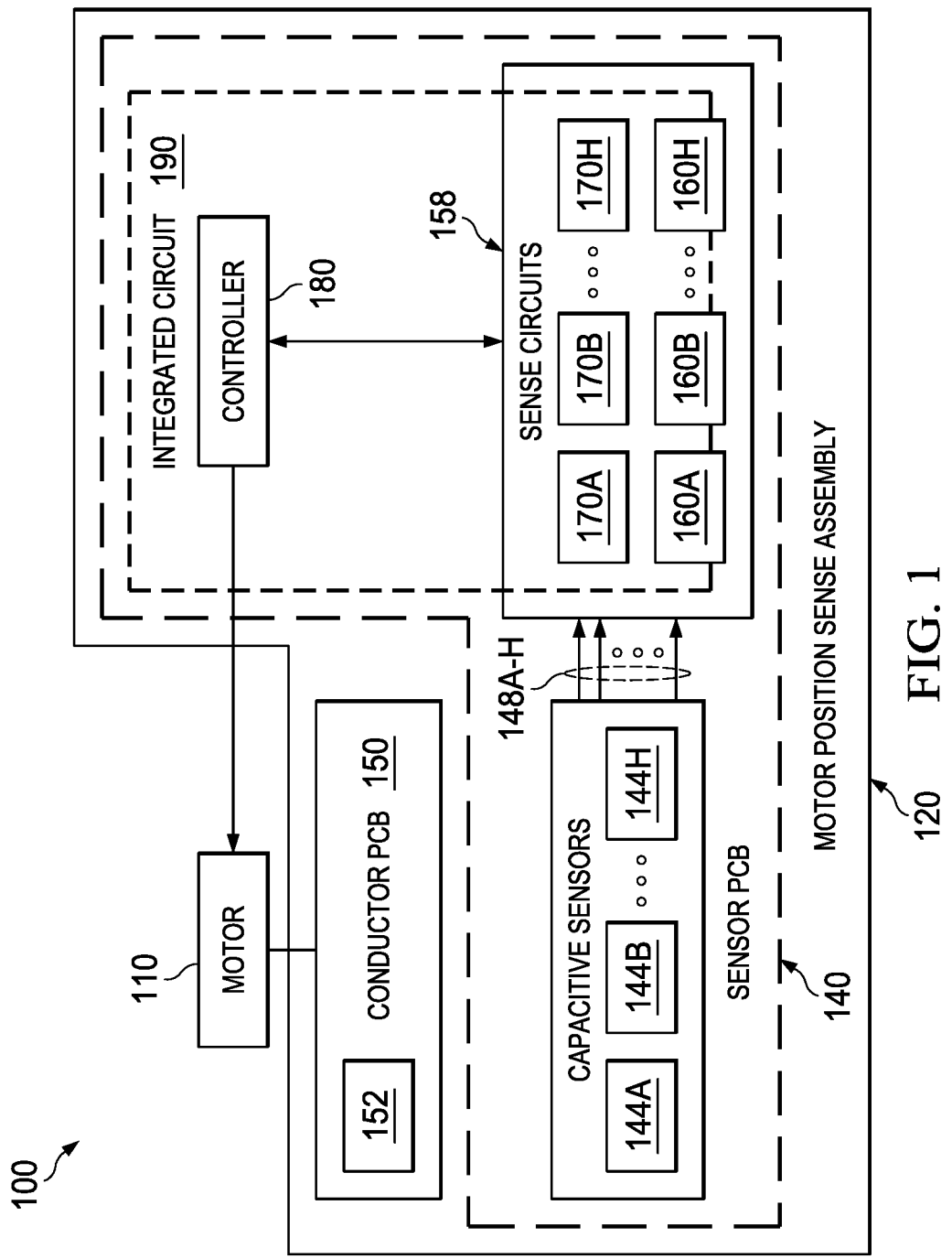
FIG. 1 is a block diagram of an example motor assembly having a motor position sense assembly in accordance with this disclosure.

Example methods and apparatus to determine a position of a rotatable shaft of a motor are disclosed. An example apparatus to determine a position of a rotatable shaft of a motor includes a sensor PCB structured to be mounted to a motor, the sensor PCB including a plurality of capacitive sensors, the plurality of capacitive sensors having respective ones of a plurality of capacitances that independently change as a conductor moves relative to the sensor PCB in conjunction with a rotatable shaft of the motor during an operation of the motor, and a controller electrically coupled to the sensor PCB, the controller configured to determine a position of the rotatable shaft based on the plurality of capacitances.

DETAILED DESCRIPTION

In some example uses of motors, it is beneficial to quickly and accurately determine rotor position and/or angle. For example, it may be beneficial during motor start up to repeatedly swing the rotor of a permanent-magnet synchronous motor (PMSM) back and forth over a small angular range. In such instances, being able to determine or estimate the rotor magnetic pole position is beneficial. Knowing rotor position can also be beneficial to detect fault conditions, such as, a rotor stop (e.g., motor no longer rotating), a rotor unbalance or wobble (e.g., when the center of mass or inertia axis of the rotor is out of alignment with the center of rotation, running axis, or geometric axis). Conventional solutions use incremental encoders or hall effect sensors. However, some conventional solutions are prone to degradation in their performance or characteristics over time. For example, some hall effect sensors can become less accurate over time. In addition to these and other benefits, disclosed examples use fewer sensor inputs than conventional solutions. For instance, using only 12 sensor inputs to determine between 54 angular positions.

Reference will now be made in detail to non-limiting examples of this disclosure, examples of which are illustrated in the accompanying drawings. The examples are described below by referring to the drawings, wherein like reference numerals refer to like elements. When like reference numerals are shown, corresponding description(s) are not repeated and the interested reader is referred to the previously discussed figure(s) for a description of the like element(s).

FIG. 1 is a block diagram of an example motor assembly 100 having an example motor 110, and an example motor position sense assembly 120, in accordance with this disclosure. As shown in the partially-exploded perspective view of FIG. 2, the example motor 110 has an example rotatable shaft 112 that can be used to, for example, perform purposeful work.

To sense motor position (e.g., an angular position of the rotatable shaft 112), the example motor position sense assembly 120 includes an example printed circuit board (PCB) assembly 130 having an example sensor PCB 140 and an example conductor PCB 150. In some examples, the sensor PCB 140 includes an opening 142 (e.g., circular) through which the rotatable shaft 112 passes, allowing the sensor PCB 140 to remain stationary with respect to rotation of the rotatable shaft 112. In some examples, the conductor PCB 150 is fixedly attached to the rotatable shaft 112, rotating together with the rotatable shaft 112 with respect to the sensor PCB 140.

Figure 2:
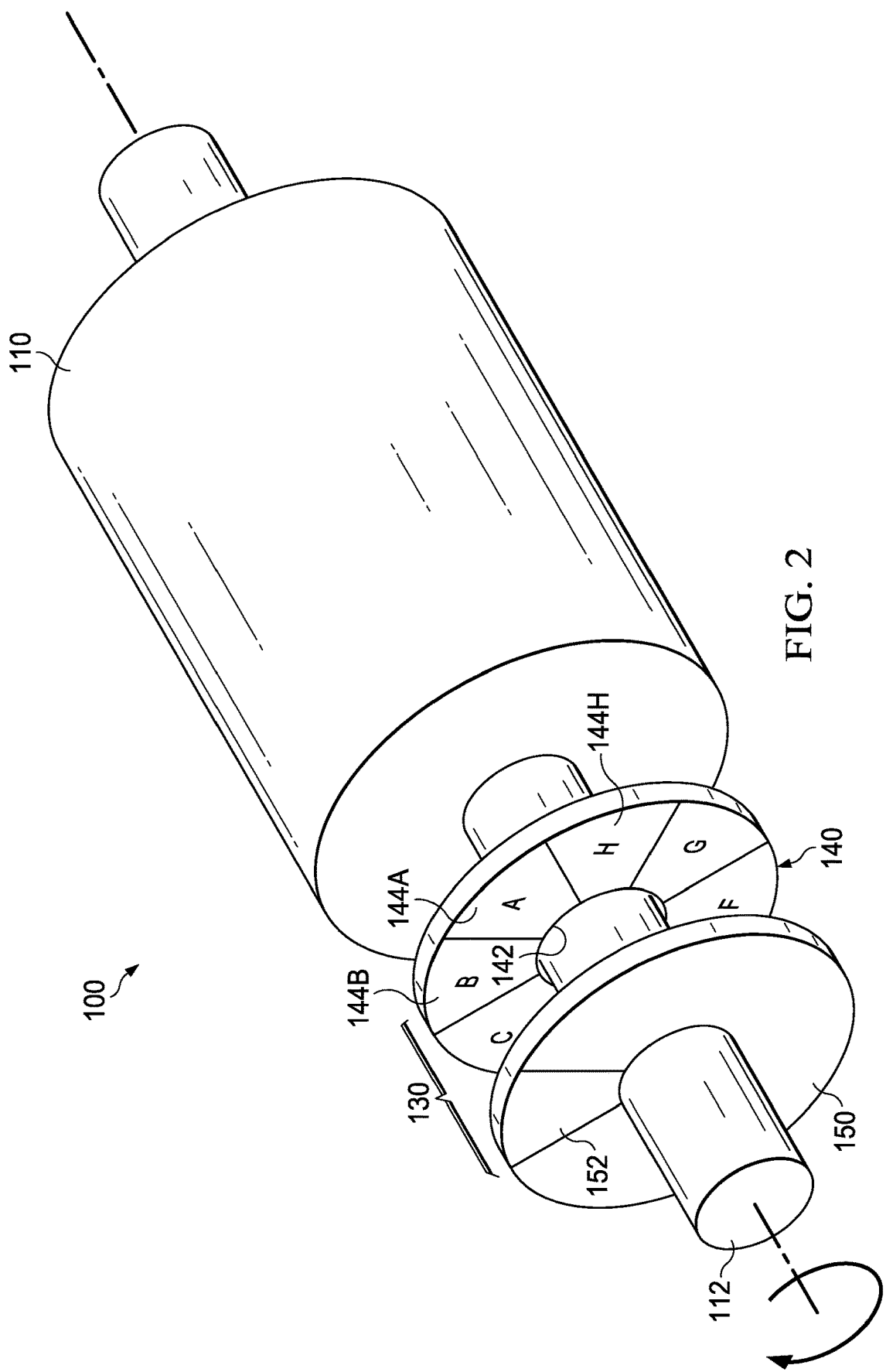
FIG. 2 is a perspective partially-exploded view of the example motor assembly of FIG. 1.
Figure 8:
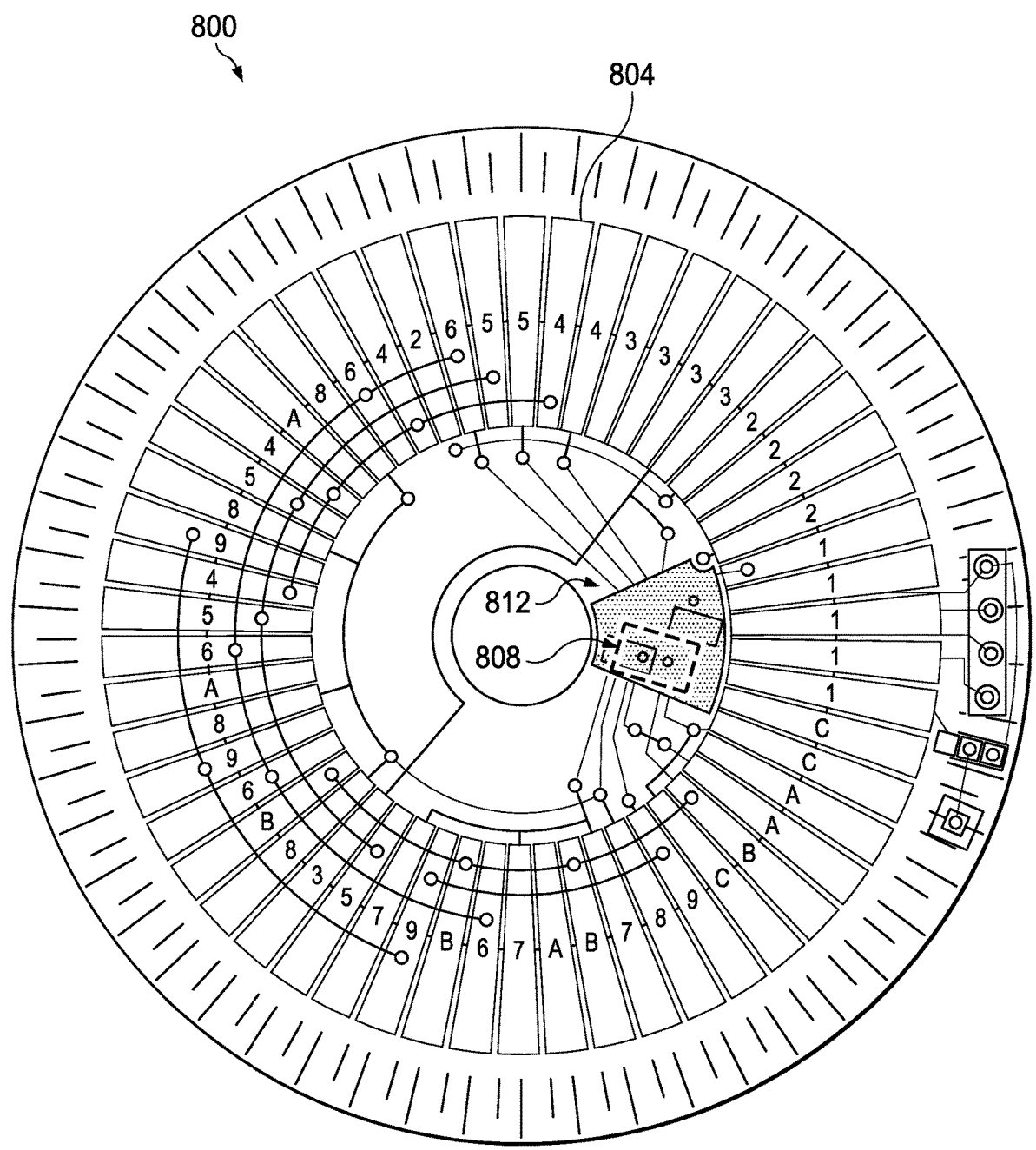
FIG. 8 is a schematic view of an example sensor PCB in accordance with the disclosure.

In the illustrated examples of FIGS. 1 and 2, the example sensor PCB 140 includes a plurality of capacitive sensors 144A-H arranged in a ring, with the capacitive sensors 144A-H associated with different angular positions of the rotatable shaft 112. Capacitances 148A-H of respective ones of the example capacitive sensors 144A-H change in response to their proximity (e.g., overlap) to an example conductor 152 (e.g., a copper pad) of the conductor PCB 150. Other example sensor PCBs are shown in FIGS. 8, 12, and 14. Other example conductor PCBs are shown in FIGS. 9, 11, 13 and 15. While example sensor PCBs and example conductor PCBs are disclosed herein, one of ordinary skill in the art will, in view of this disclosure, ready appreciate that capacitive sensors and conductors may be positioned in other arrangements to determine a position of a rotatable shaft of a motor.

Figure 3:
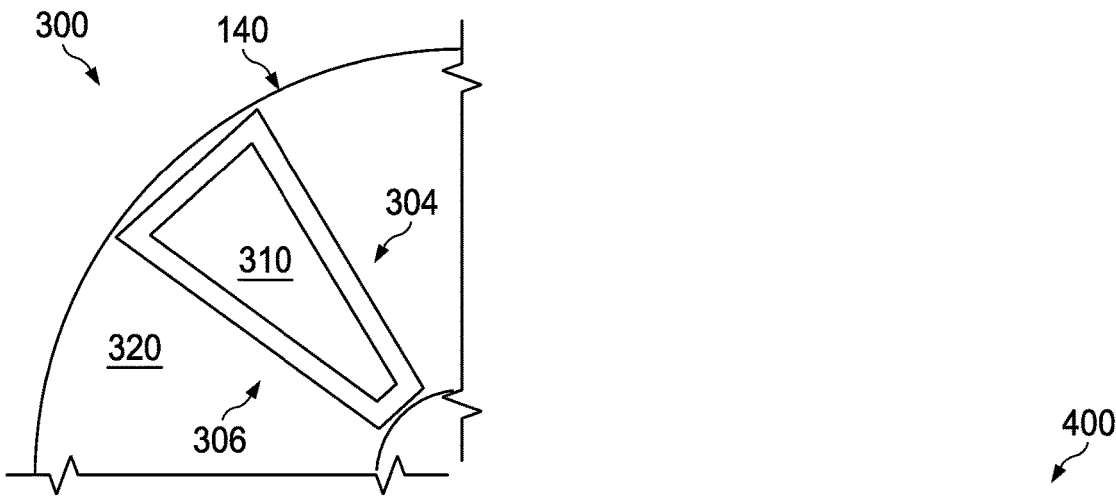
FIG. 3 is a top view of an example portion of the example sensor printed circuit board (PCB) of FIGS. 1 and 2, in accordance with the disclosure.
Figure 4:
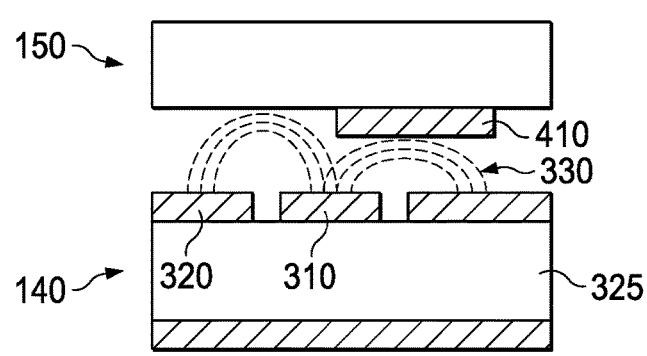
FIG. 4 is a side view of an example portion of the example PCB assembly of FIGS. 1 and 2, in accordance with the disclosure.

Turning to FIGS. 3 and 4, an example capacitive sensor 304 and an example conductor 410 that may be used to implement the example motor position sense assembly 120 of FIGS. 1 and 2 are shown. FIG. 3 is a top view of an example portion 300 of the example sensor PCB 140 of FIGS. 1 and 2. FIG. 4 is a side cross-section view of an example portion 400 of the example PCB assembly 130 of FIGS. 1 and 2 corresponding to the example portion 300 of FIG. 3. In FIGS. 3 and 4, the example capacitive sensor 304 is formed as an example PCB-based capacitor 306 including an example conductive region 310 and an example ground region 320 formed on an example PCB substrate 325. The example ground region 320 is spaced apart from the example conductive region 310 (e.g., not in physical contact, not in electrical contact, etc.) to form an example electric field 330 in an area about (e.g., above, surrounding, including, etc.) the PCB-based capacitor 306. In the example of FIGS. 3 and 4, the ground region 320 surrounds the wedge shaped conductive region 310, however, PCB-based capacitors having other geometric and non-geometric arrangements (e.g., circles, rectangles, etc.) may be used. In the example of FIGS. 3 and 4, self-capacitance is implemented. However, other forms of capacitance, such as mutual-capacitance may be implemented. In some examples, the ground region 320 is implemented as a common ground region in the central area of the sensor PCB 140, and a conductor extends inward to overlap with the common ground region on the sensor PCB 140.

As the example conductor 410 (e.g., a copper pad) moves, the conductor 410 can move into, through, and out of the electric field 330. When the conductor 410 is at least partially above or near the capacitive sensor 304 in the electric field 330, the conductor 410 interferes with the electric field 330, thereby increasing the capacitance of the PCB-based capacitor 306 beyond the baseline capacitance of the PCB-based capacitor 306. By monitoring the capacitance of the PCB-based capacitor 306, the proximity of the conductor 410 to the capacitive sensor 304 can be detected, and the amount of overlap (e.g., 25%, 50%, 75%, 100%, etc.) can be determined (e.g., estimated, calculated, etc.). In some examples, the largest capacitance occurs when the conductor 410 and the capacitive sensor 304 are aligned (e.g., fully overlapped, overlapped as much as possible, etc.).

Returning to FIGS. 1 and 2, determining (e.g., measuring, estimating, representing, etc.) which capacitive sensor(s) 144A-H has/have the largest respective capacitances 148A-H at a given time can be used to determine (e.g., decode, estimate, etc.) the angular position of the conductor 152 and, thus, the angular position of the rotatable shaft 112 of the motor 110.

Figure 5:
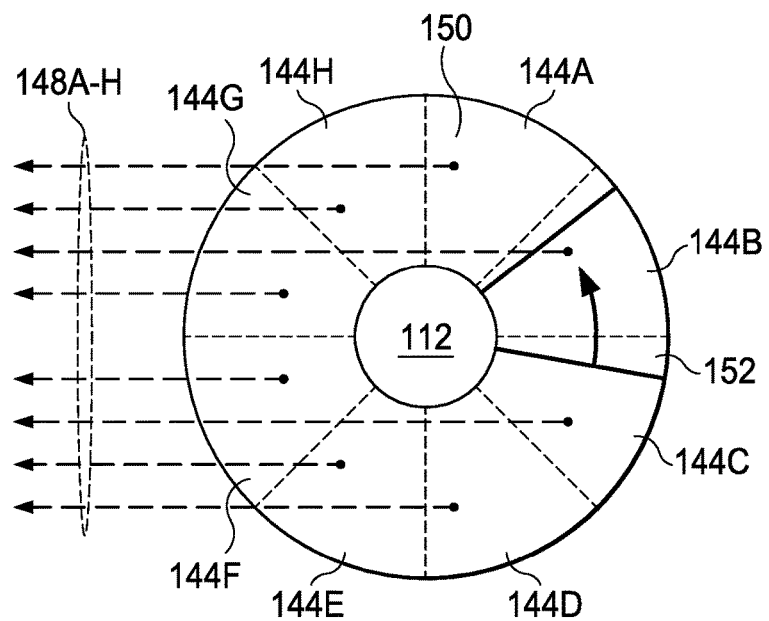
FIG. 5 is an end view of the example motor of FIGS. 1 and 2 illustrating an example operation of the example motor of FIGS. 1 and 2, in accordance with the disclosure.

Turning to FIG. 5, an end view of the example motor assembly 100 of FIGS. 1 and 2 is shown. As the rotatable shaft 112 of the motor 110 rotates, the conductor 152 of the conductor sensor PCB 150 sequentially rotates into and out of overlap with the capacitive sensors 144A-H. In FIG. 5, the conductor 152 is partially overlapping the capacitive sensor 144B and the capacitive sensor 144C.

Figure 6:
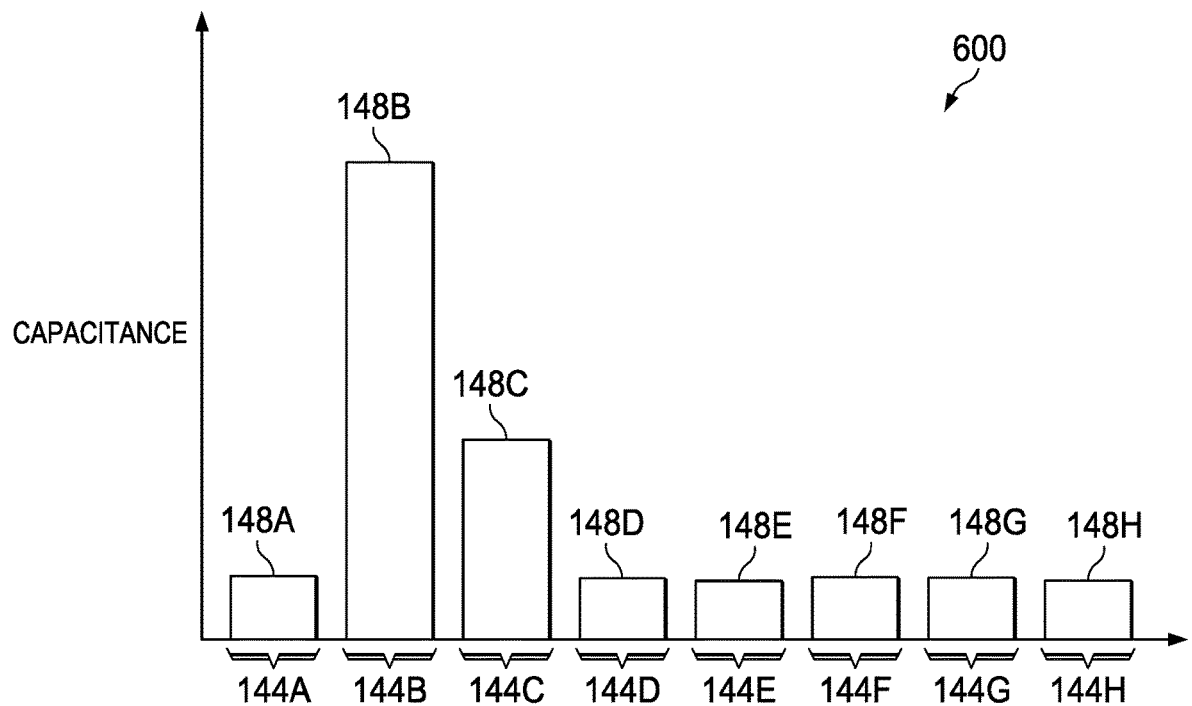
FIG. 6 is a graph illustrating example capacitances of the example sensor regions of FIG. 5 for an example position of the motor of FIGS. 1 and 2, in accordance with the disclosure.

FIG. 6 is an example graph 600 of example capacitances 148A-H for respective ones of the capacitive sensors 144A-H. The example graph 600 corresponds to the example positions of the conductor 152 and capacitive sensors 144A-H shown in FIG. 5. As explained above in connection with FIGS. 3 and 4, the capacitance 148A-H of a capacitive sensor 144A-H depends on its proximity to a conductor. Because, in FIG. 5, the conductor 152 overlaps the capacitive sensor 144B and the capacitive sensor 144C, they have larger respective capacitances 148B and 148C than the other capacitive sensors 144A, and 144D-H. Moreover, because the conductor 152 overlaps more of the capacitive sensor 144B than the capacitive sensor 144C, the capacitance 148B is greater than the capacitance 148C. If the conductor 152 were positioned differently than in FIG. 5, the capacitances 148A-H would have corresponding changes to reflect which of the capacitive sensors 144A-H now overlap the conductor 152. In the example of FIGS. 5 and 6, the capacitance 148B is approximately three times the capacitance 148C, indicating that the conductor 152 overlaps approximately 75% of the capacitive sensor 144B and 25% of the capacitive sensor 144C.

Figure 7:
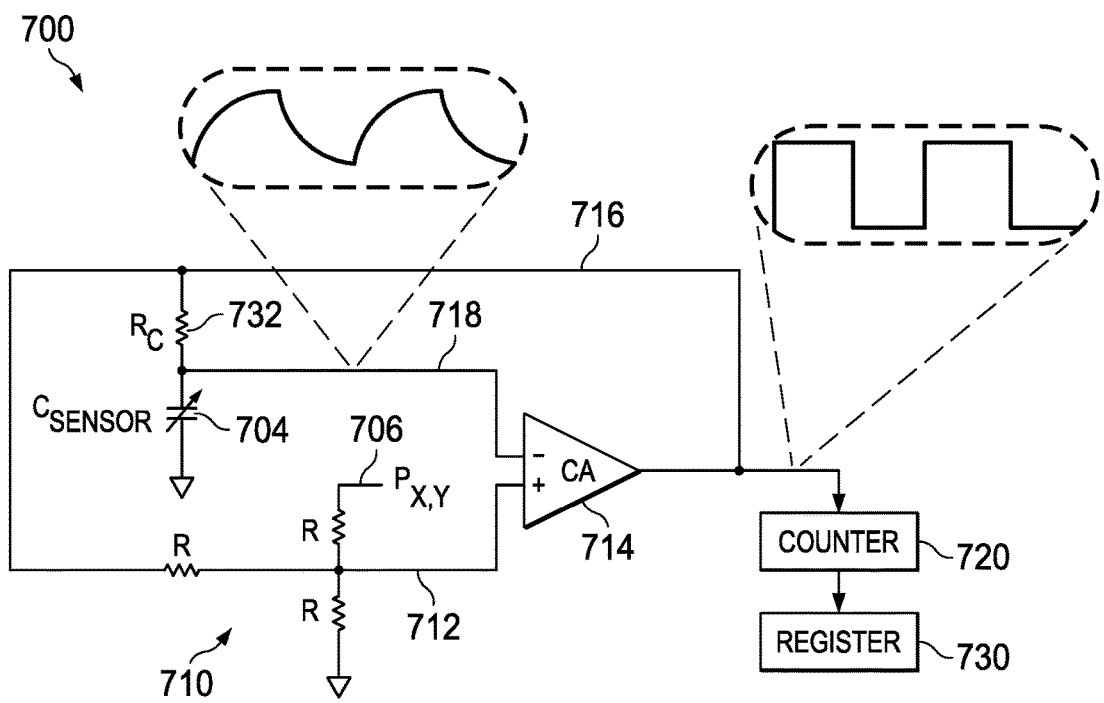
FIG. 7 is a schematic diagram of an example oscillator circuit that may be used to implement an example sense circuit of FIG. 1, in accordance with the disclosure.
Figure 19:
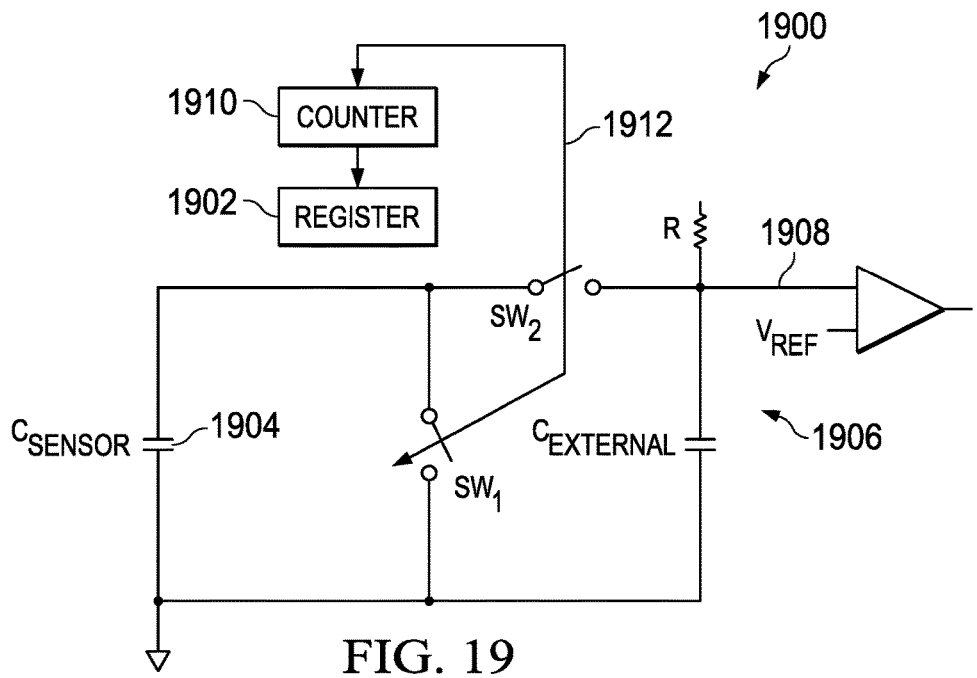
FIG. 19 is a schematic diagram of another example circuit that may be used to implement an example sense circuit of FIG. 1, in accordance with the disclosure.
Figure 20:
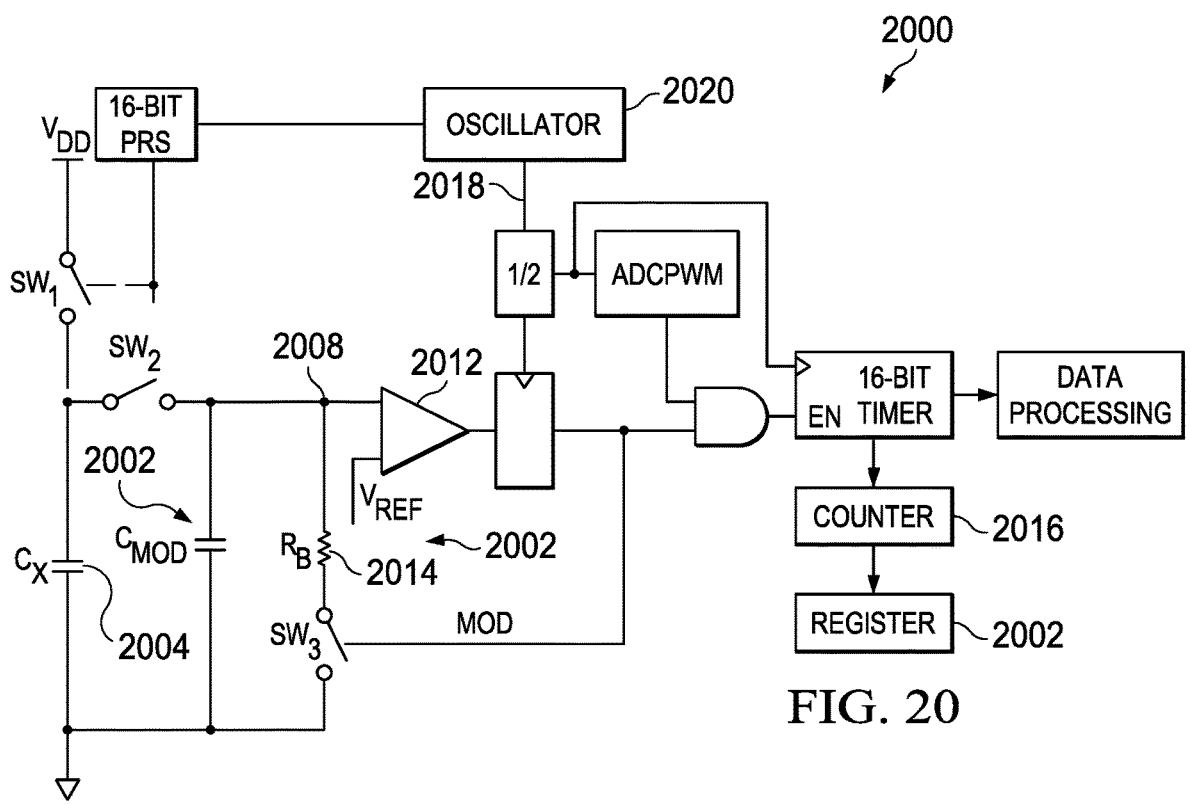
FIG. 20 is a schematic diagram of yet another example circuit that may be used to implement an example sense circuit of FIG. 1, in accordance with the disclosure.

Returning to FIG. 1, to measure the capacitances 148A-H, the example motor position sense assembly 120 includes example sense circuits 160A-H, and example count registers 170A-H for respective ones of the example capacitive sensors 144A-H. Example sense circuits include, but are not limited to, a charge-transfer circuit, a relaxation-oscillator circuit, a sigma-delta modulator circuit, a successive approximation circuit, etc. FIGS. 7, 19 and 20 are schematic diagrams of non-limiting example circuits 700, 1900, and 2000, respectively, which may be used to implement the example sense circuits 160A-H of FIG. 1. FIG. 7 is a schematic diagram of an example oscillator circuit 700 and an example count register 730 for a capacitive sensor 704, which may be used to implement the example sense circuits 160A-H and the example count registers 170A-H. When a control input 706 is set to a logic high (e.g., equal to a supply voltage Vcc), an example resistor ladder network 710 creates an example reference input 712 for an example comparator 714 that changes with an example output 716 of the comparator 714. The example reference input 712 toggles and has a polarity that is opposite the charge and discharge of the capacitive sensor 704. In the example of FIG. 7, if the resistors R of the resistor ladder network 710 have approximately equal resistances, then the oscillation frequency $f_{OSC}$ of the output 716 of the comparator 714 can be expressed mathematically as $$f_{OSC}=1/(1.386R_C C_{SENSOR}),$$

where $C_{SENSOR}$ is the capacitance 718 of the capacitive sensor 704, which varies responsive to the proximity of a conductor, such as the example conductor 152 or the example conductor 410. As discussed above in connection with FIGS. 3-7, as a conductor interferes with the electric field 330 of a capacitive sensor 304, the capacitance 718 of the capacitive sensor 304 increases and, thus, the oscillation frequency $f_{OSC}$ of the output 716 of the comparator 714 increases. That is, the oscillation frequency $f_{OSC}$ can be used as a measure of the capacitance 718 of the capacitive sensor 304.

To determine (e.g., estimate, measure, etc.) the oscillation frequency $f_{OSC}$ of the output signal 716 of the comparator 714, the example oscillator circuit 700 includes an example counter 720 and the example count register 730. The example counter 720 counts oscillations or cycles of the output signal 716 by, for example, counting rising or falling edges of the output 716. At periodic intervals, the current oscillation count is stored in the example count register 730 for subsequent retrieval, and the counter 720 is reset. The larger the oscillation count stored in the count register 730, the higher the oscillation frequency $f_{OSC}$ of the output 716, and the larger the capacitance 718 of the capacitive sensor 704, which indicates a larger interference of the capacitive sensor 704 by a conductor. Thus, oscillation counts stored in the count registers 730, 170A-H for respective ones of the oscillation circuits 700, 160A-H can be used to determine which capacitive sensors 704, 144A-H are in close(-st) proximity to a conductor, and, thus, to determine the angular position of the rotatable shaft 112 of the motor 110.

Returning to FIG. 1, to determine the position of the rotatable shaft 112, the example motor assembly 100 of FIG. 1 includes an example controller 180, such as that shown in FIG. 22 and discussed below. As discussed below, the example controller 180 of FIG. 1 periodically and/or aperiodically obtains oscillation counts stored in the count registers 170A-H, and uses the oscillation counts to determine the angular position of the rotatable shaft 112. In some examples, the controller 180 controls the motor 110 based in part on motor positions determined using the capacitive sensors 144A-H.

In some examples, the sensor PCB 140 includes the example capacitive sensors 144A-144H, the example sense circuits 160A-160H, the example count registers 170A-170H, and the example controller 180. In some examples, a portion of each of the sense circuits 160A-160H (e.g., the comparator 714 and the counter 720), the count registers 170A-H, and the controller 180 are implemented by an integrated circuit (IC) 190. Example ICs 190 include, but are not limited to, MSP430 microcontrollers with CapTIvate™ technology by Texas Instruments Incorporated, CapSense® Controllers by Cypress Semiconductor Corp., and maXTouch® Touchscreen Controllers by Microchip Technology Inc.

While example implementations of the example motor position sense assembly 120, the example PCB assembly 130, the example sensor PCB 140, the example capacitive sensors 144A-H, the example conductor PCB 150, the example conductor 152, the example sense circuits 160A-H, the example count registers 170A-H, the example controller 180, the example integrated circuit 190, the example capacitive sensor 304, the example PCB-based capacitor 306, the example conductive region 310, the example ground region 320, the example substrate 325, the conductor 410, the capacitive sensor 704, the resistor ladder 710, the comparator 714, the counter 720 and the count register 730 are shown in FIGS. 1-7, one or more of the elements, processes and/or devices illustrated in FIGS. 1-7 may be combined, divided, re-arranged, omitted, eliminated and/or implemented in any other way. Further, the example motor position sense assembly 120, the example PCB assembly 130, the example sensor PCB 140, the example capacitive sensors 144A-H, the example conductor PCB 150, the example conductor 152, the example sense circuits 160A-H, the example count registers 170A-H, the example controller 180, the example integrated circuit 190, the example capacitive sensor 304, the example PCB-based capacitor 306, the example conductive region 310, the example ground region 320, the example substrate 325, the conductor 410, the capacitive sensor 704, the resistor ladder 710, the comparator 714, the counter 720 and the count register 730 of FIGS. 1-7 may be implemented by hardware, software, firmware and/or any combination of hardware, software, and/or firmware. Thus, for example, any of the example motor position sense assembly 120, the example PCB assembly 130, the example sensor PCB 140, the example capacitive sensors 144A-H, the example conductor PCB 150, the example conductor 152, the example sense circuits 160A-H, the example count registers 170A-H, the example controller 180, the example integrated circuit 190, the example capacitive sensor 304, the example PCB-based capacitor 306, the example conductive region 310, the example ground region 320, the example substrate 325, the conductor 410, the capacitive sensor 704, the resistor ladder 710, the comparator 714, the counter 720 and the count register 730 could be implemented by one or more analog or digital circuit(s), logic circuits, programmable processor(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)). When reading any of the apparatus or system claims of this patent to cover a purely software and/or firmware implementation, at least one of the example motor position sense assembly 120, the example PCB assembly 130, the example sensor PCB 140, the example capacitive sensors 144A-H, the example conductor PCB 150, the example conductor 152, the example sense circuits 160A-H, the example count registers 170A-H, the example controller 180, the example integrated circuit 190, the example capacitive sensor 304, the example PCB-based capacitor 306, the example conductive region 310, the example ground region 320, the example substrate 325, the conductor 410, the capacitive sensor 704, the resistor ladder 710, the comparator 714, the counter 720 and the count register 730 is/are hereby expressly defined to include a tangible computer-readable storage medium storing the software and/or firmware. Further still, the example motor position sense assembly 120, the example PCB assembly 130, the example sensor PCB 140, the example capacitive sensors 144A-H, the example conductor PCB 150, the example conductor 152, the example sense circuits 160A-H, the example count registers 170A-H, the example controller 180, the example integrated circuit 190, the example capacitive sensor 304, the example PCB-based capacitor 306, the example conductive region 310, the example ground region 320, the example substrate 325, the conductor 410, the capacitive sensor 704, the resistor ladder 710, the comparator 714, the counter 720 and the count register 730 of FIGS. 1-7 may include one or more elements, processes and/or devices in addition to, or instead of, those illustrated in FIGS. 1-7, and/or may include more than one of any or all of the illustrated elements, processes and devices.

Figure 9:
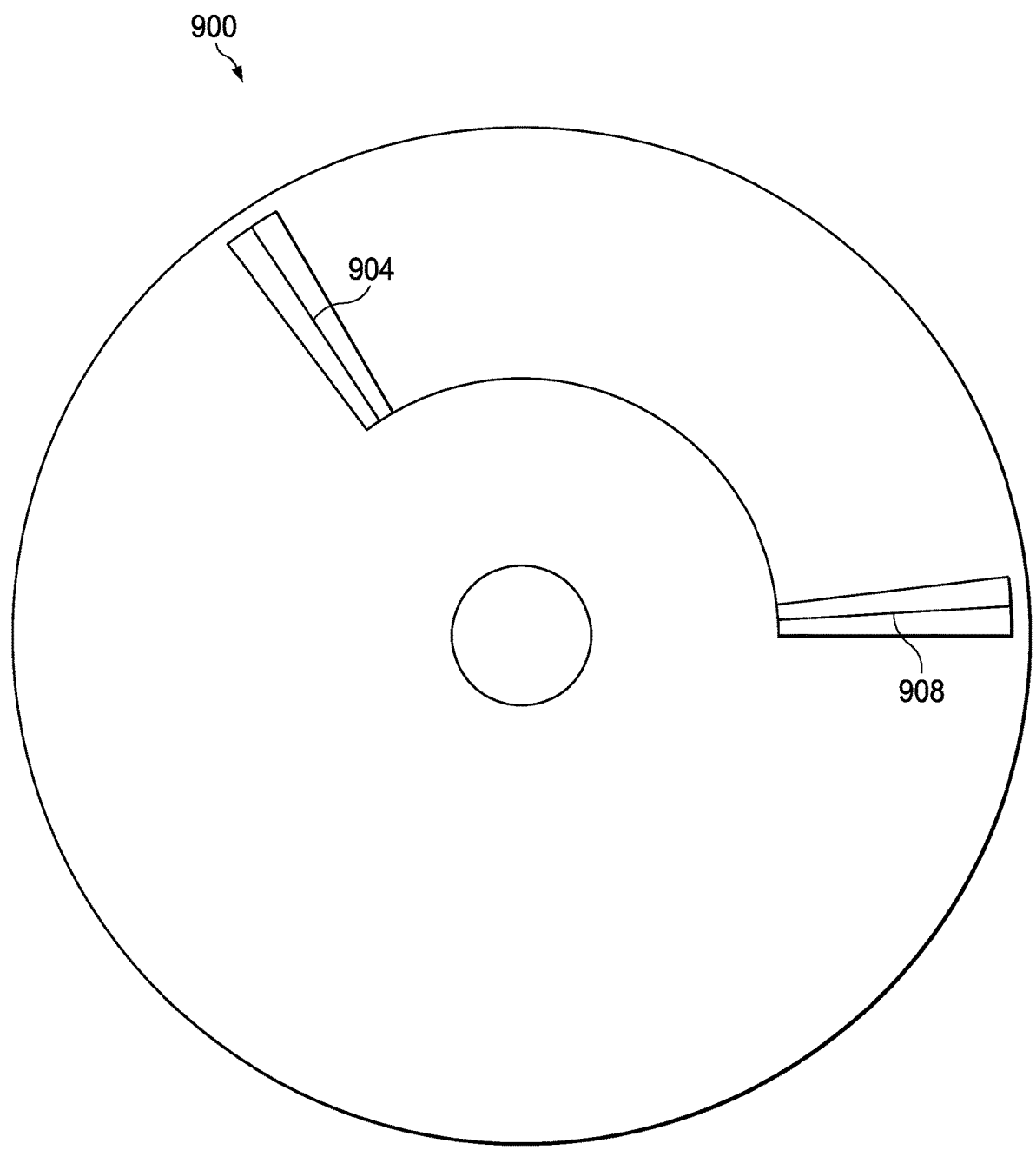
FIG. 9 is a schematic view of an example conductor PCB, in accordance with the disclosure, that may be used together with the example sensor PCB of FIG. 8.

Turning to FIG. 8, a schematic diagram of another example sensor PCB 800 is shown that may be used together with an example conductor PCB 900 shown in FIG. 9 to determine an angular position of a rotatable shaft of a motor, in accordance with this disclosure. The example sensor PCB 800 of FIG. 8 includes 54 capacitive sensing regions, one of which is designated at reference numeral 804. In the example of FIG. 8, the capacitive sensing regions 804 are wedge-shaped regions that extend radially. The 54 capacitive sensing regions 804 are assigned to 12 groups, labeled 1, 2, . . . , 9, A, B, C in FIG. 8. Capacitive sensing regions 804 that are assigned to the same group are electrically coupled (e.g., in parallel, by electrically coupling their conductive regions 310). Each of the example groups 1, 2, . . . , 9, A, B, C is connected to a respective sense circuit (e.g., the example oscillator circuit 700 of FIG. 7) and an IC 808 (e.g., the example IC 190 of FIG. 1) located in a central area 812 of the sensor PCB 800.

As will be explained below, the capacitive sensing regions 804 are assigned to the groups 1, 2, . . . , 9, A, B, C according to an example pattern (see FIG. 10) that allows for unambiguous decoding of 54 rotational positions, when used with the example conductor PCB 900 of FIG. 9, while requiring 12 rather than 54 sense circuits, IC input pins and counters.

The example conductor PCB 900 of FIG. 9 includes two conductors 904 and 908 that are spaced 120 degrees apart. The example conductors 904 and 908 of FIG. 9 have shapes corresponding to the capacitive sensing regions 804 of FIG. 8.

In operation, the example conductor PCB 900 rotates relative to the example sensor PCB 800. When the conductor 904 and the conductor 908 overlap with respective ones of the capacitive sensing regions 804, two different groups of the groups 1, 2, . . . , 9, A, B, C will have their capacitance increased due to the proximity of their respective conductor 904, 908. As discussed above, the capacitance increase causes the oscillation count for the group to increase. Thus, the two groups with the largest oscillation counts represent the respective locations of the conductor 904 and the conductor 908.

FIG. 10 is an example table 1000 that may be used to determine angular position of a rotatable shaft knowing which two sensing groups have the largest oscillation counts. For example, knowing that groups 3 and A have the largest oscillation counts, row 1010 of the table 1000 is identified, and the angular position of 73 degrees is obtained from the example row 1010.

In some examples, the table 1000 is determined by rotating the conductor PCB 900 through each angular position and recording which groups on the sensor PCB 800 overlap the conductors 904 and 908 for each angular position.

In some examples, the table 1000 is interpolated to obtain finer angular resolution. For example, if groups 3, 4, 8 and A have the largest oscillation counts, and have approximately equal oscillation counts, then the row 1010 and a row 1012 can be identified, and an angle of 76.5 degrees, which is approximately halfway between 73 degrees (row 1010) and 80 degrees (row 1012) is used as the angular position of the rotatable shaft 112.

Figure 11:
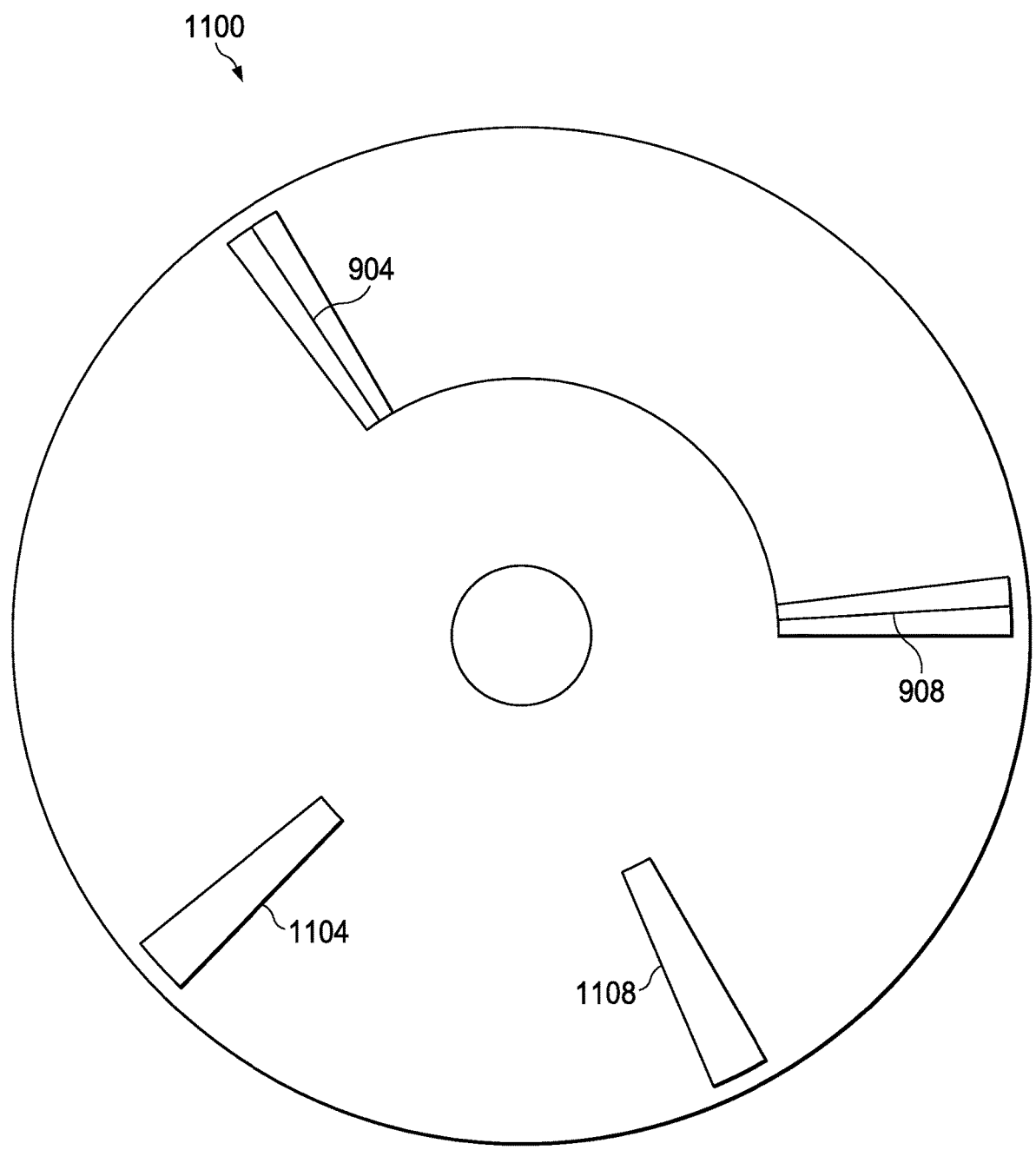
FIG. 11 is a schematic view of another example conductor PCB, in accordance with the disclosure, that may be used together with the example sensor PCB of FIG. 8.
Figure 12:
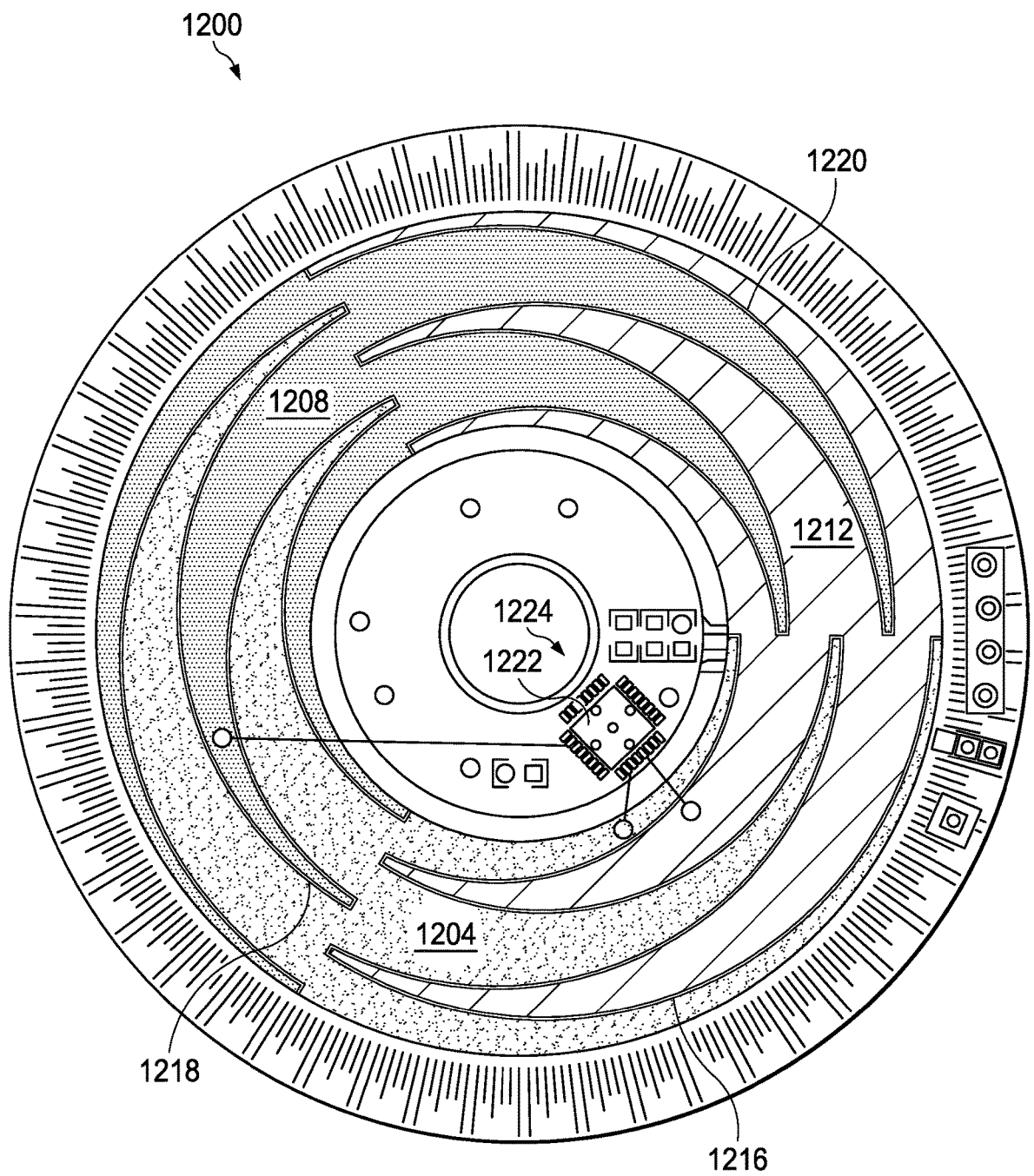
FIG. 12 is a schematic view of another example sensor PCB in accordance with the disclosure

In another example conductor PCB 1100 shown in FIG. 11, additional conductors 1104 and 1108 are added to the example conductor PCB 900 of FIG. 9. In the example of FIG. 11, the additional conductors 1104 and 1108 can be used to provide additional decoding redundancy. The additional redundancy can be used to overcome faulty capacitive sensing regions using, for example, 3 out of 4 majority decoding.

FIG. 12 is a schematic diagram of yet another example sensor PCB 1200. The example sensor PCB 1200 of FIG. 12 has 3 example capacitive sensing regions 1204, 1208 and 1212. The example capacitive sensing regions 1204, 1208 and 1212 of FIG. 12 have finger-like interlocking or interlaced shapes. The capacitive sensing regions 1204, 1208 and 1212 are defined by 3 accordion or fan fold like barriers 1216, 1218 and 1220. Similar to FIG. 8, each of the example capacitive sensing regions 1204, 1208 and 1212 is connected to a respective sense circuit (e.g., the example oscillator circuit 700 of FIG. 7) and an IC 1222 (e.g., the example IC 190 of FIG. 1) located in a central area 1224 of the sensor PCB 1200.

Figure 13:
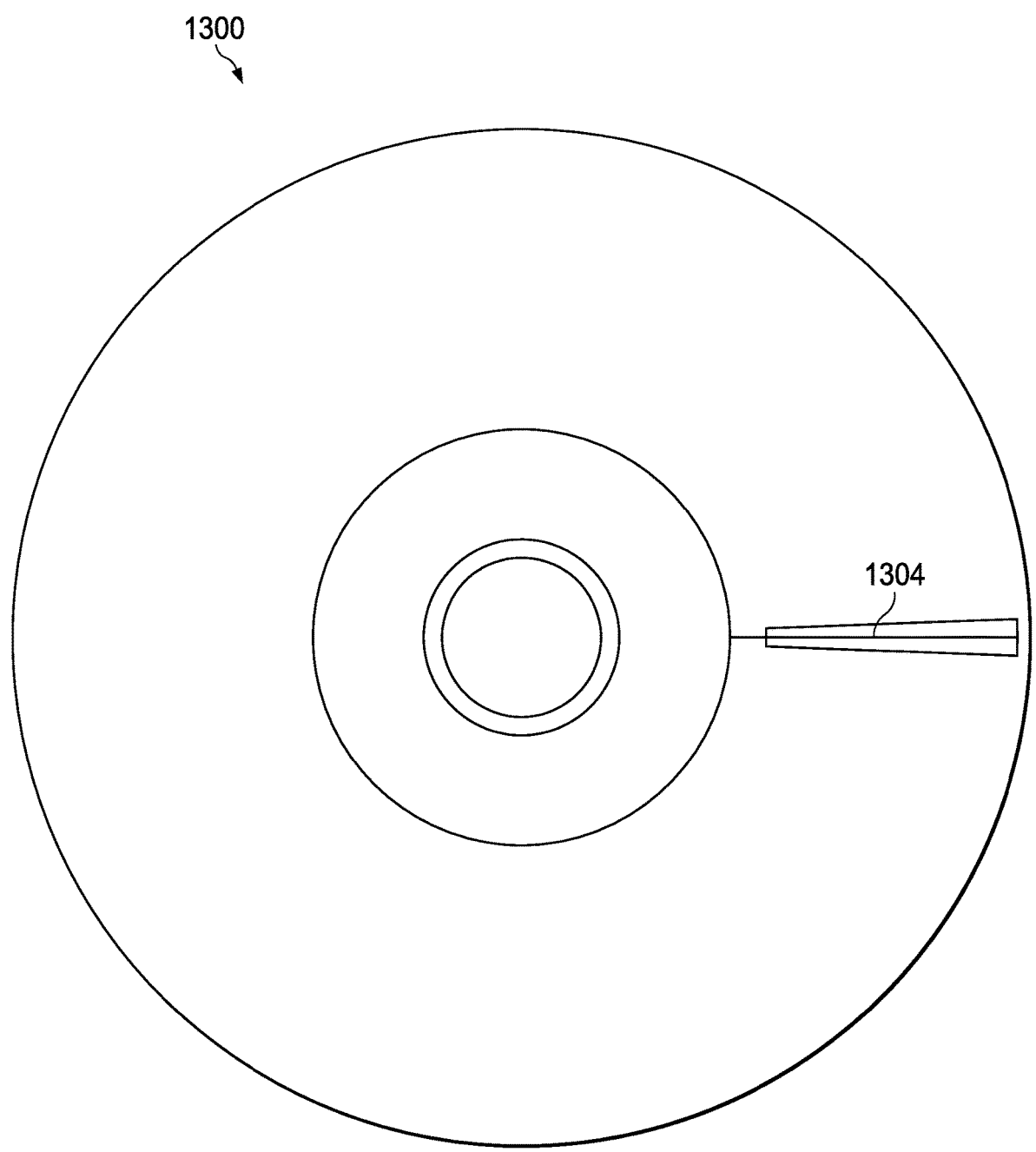
FIG. 13 is a schematic view of an example conductor PCB in accordance with the disclosure, that may be used together with the example sensor PCB of FIG. 12.
Figure 14:
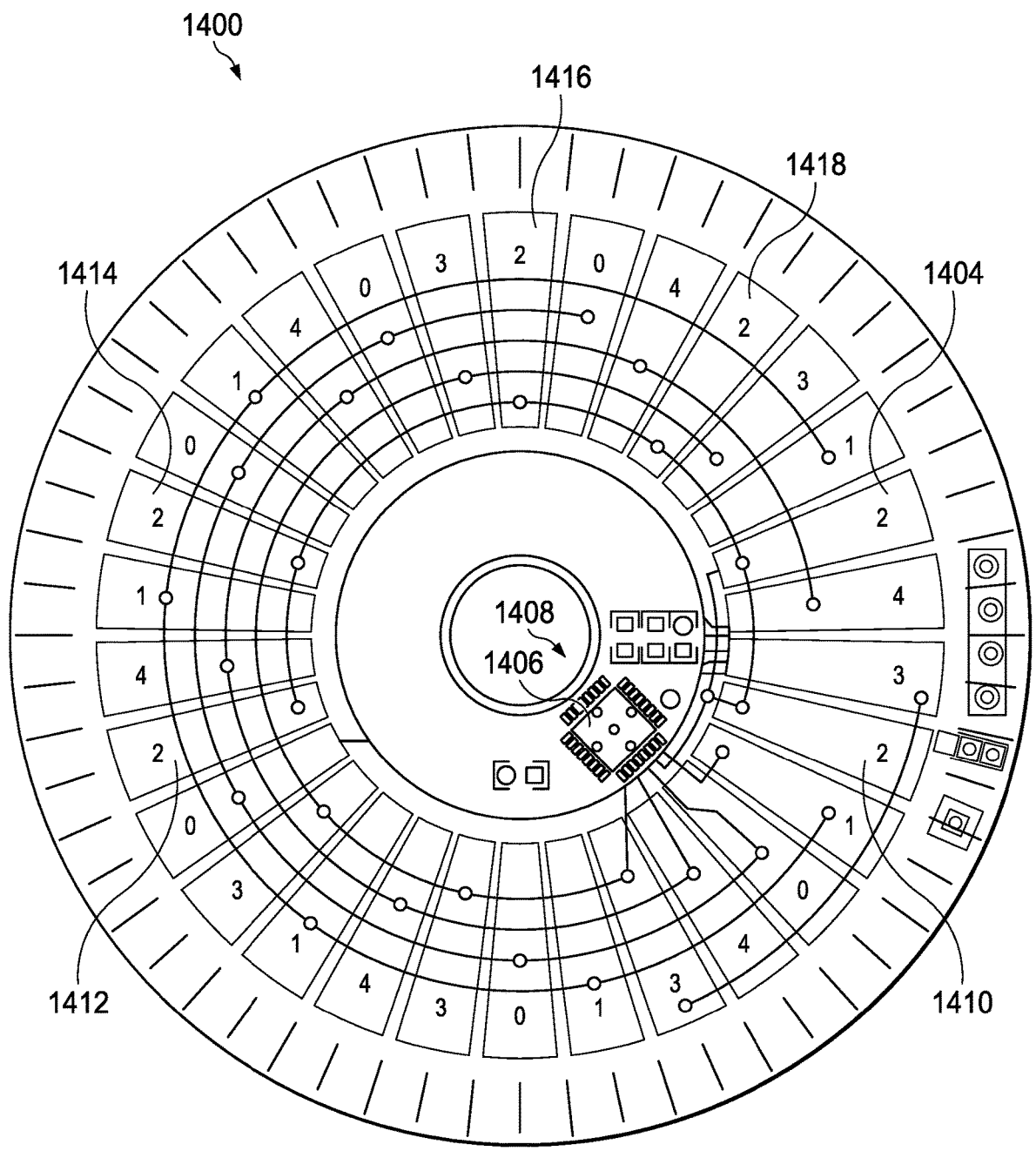
FIG. 14 is a schematic view of yet another example sensor PCB in accordance with the disclosure

FIG. 13 is a schematic diagram of an example conductor PCB 1300 that can be used together with the example sensor PCB 1200 of FIG. 12 to determine angular position of the rotatable shaft 112. The example conductor PCB 1300 of FIG. 13 includes a single conductor 1304.

In operation, the example conductor PCB 1300 rotates relative to the sensor PCB 1200. As the conductor 1304 sweeps across the capacitive sensing regions 1204, 1208 and 1212, the capacitances and, thus, corresponding oscillation counts for the capacitive sensing regions 1204, 1208 and 1212 change. For example, starting from the 3 o'clock position in FIG. 12 and rotating counter-clock wise, the oscillation count for capacitive sensing region 1212 will start with its largest value and decrease until it reaches its smallest value at the 11 o'clock position. Simultaneously, the oscillation count for the capacitive sensing region 1208 will start with its smallest value and increase until it reaches its largest value at the 11 o'clock position. Accordingly, the oscillation counts for the capacitive sensing regions 1204, 1208 and 1212 can be used to determine angular position.

Figure 15:
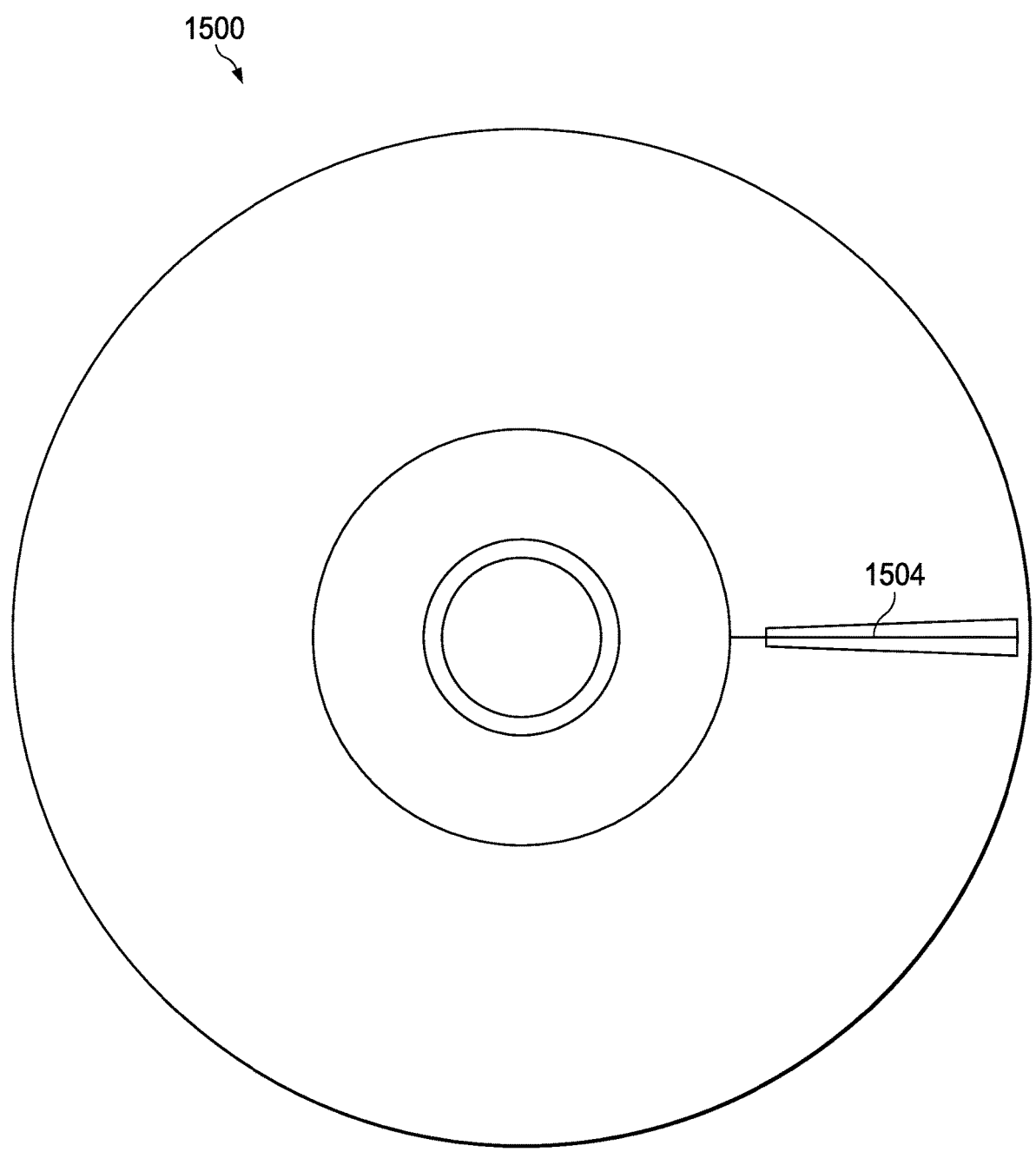
FIG. 15 is a schematic view of an example conductor PCB in accordance with the disclosure, that may be used together with the example sensor PCB of FIG. 14.

Turning to FIG. 14, a schematic diagram of another example sensor PCB 1400 is shown that may be used together with an example conductor PCB 1500 shown in FIG. 15 to determine an angular position of the rotatable shaft 112, in accordance with this disclosure. The example sensor PCB 1400 of FIG. 14 includes 30 capacitive sensing regions, one of which is designated at reference numeral 1404. In the example of FIG. 14, the capacitive sensing regions 1404 are wedge-shaped regions that extend radially. The 30 capacitive sensing regions 1404 are assigned to five groups, labeled 0, 1, . . . , 4 in FIG. 14. Capacitive sensing regions 1404 that are assigned to the same group are electrically coupled (e.g., in parallel, by electrically coupling their conductive regions 310). Similar to FIG. 8, each of the example groups 0, 1, . . . , 4 is connected to a respective sense circuit (e.g., the example oscillator circuit 700 of FIG. 7) and an IC 1406 (e.g., the example IC 190 of FIG. 1) located in a central area 1408 of the sensor PCB 1400.

FIG. 15 is a schematic diagram of an example conductor PCB 1500 that can be used together with the example sensor PCB 1400 of FIG. 14 to determine angular position of the rotatable shaft 112. The example conductor PCB 1500 of FIG. 15 includes a single conductor 1504. In operation, the example conductor PCB 1500 rotates clockwise relative to the sensor PCB 1400. As the conductor 1504 sweeps across the capacitive sensing regions 1404, the capacitances and, thus, corresponding oscillation counts for the capacitive sensing regions 1404 change.

The capacitive sensing regions 1404 are assigned to the groups 0, 1, . . . , 4 so a non-repeating sequence of groups is identified as the conductor PCB 1500 rotates. For example, if group 2 currently has the largest oscillation count, then the angular position could correspond to any of 5 capacitive sensing regions 1404, 1410, 1412, 1414, 1416 and 1418. However, knowing the previous group with the largest oscillation count was group 3, the currently angular position can be determined to correspond to capacitive sensing region 1410. In some cases, more than one previous group may be used to decode the angular position. Likewise, additional previous groups may be used to provide redundancy, or correct for potential decoding errors.

The example sensor PCBs and conductor PCBs may, additionally and/or alternatively, be used to detect other conditions such as motor stop, rotor unbalance, etc. For example, if the controller 180 expects the motor 110 to be operating but the oscillation counts are not changing as expected for a rotating motor (e.g., the same capacitive sensor 144A-H repeatedly has the largest oscillation count), then the controller 180 can determine that the motor 110 has stopped rotating. When the motor 110 is operating smoothly (e.g., without a wobble or imbalance), the capacitive sensors 144A-H will have approximately the same largest oscillation counts. Accordingly, the controller 180 can determine conditions such as a wobble or imbalance by looking for variations in the oscillation counts (e.g., an oscillation, such as, a sinusoidal variation, in the maximum values of an oscillation count) due to changes or variations in conductor and capacitive sensor overlap while the motor rotates. Such variations occur when a conductor overlaps with a capacitive sensor by different amounts as the conductor rotates in addition to wobbling back and forth.

Figure 16:
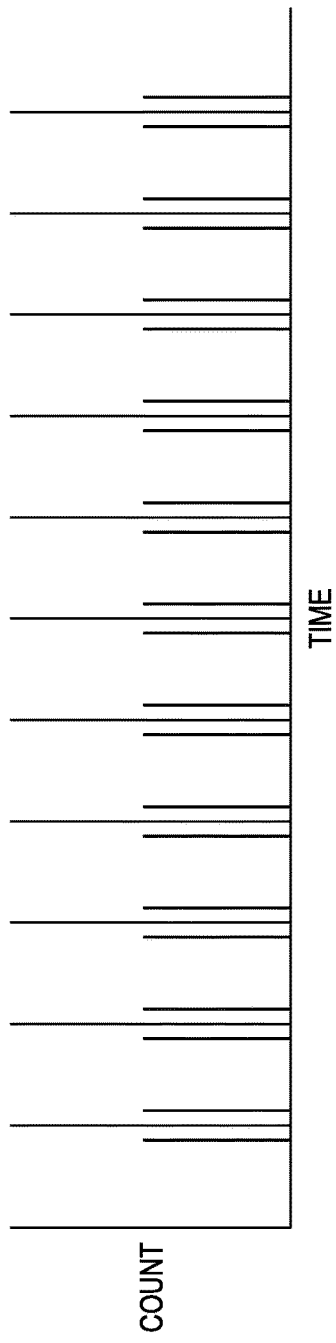
FIGS. 16-18 are examples graphs of example counts that may be used to detect fault conditions.

FIG. 16 is an example graph of example cycles counts for one of the example capacitive sensors 144A-H and the example sense circuits 160A-H. For clarity of illustration, the example graph is not drawn to scale for either access. As the conductor PCB 150 rotates, the count will periodically increase when the conductor 152 overlaps the capacitive sensor 144A-H. As explained above, this periodic increase can be used to determine that the conductor 152 is located at the capacitive sensor.

Figure 17:
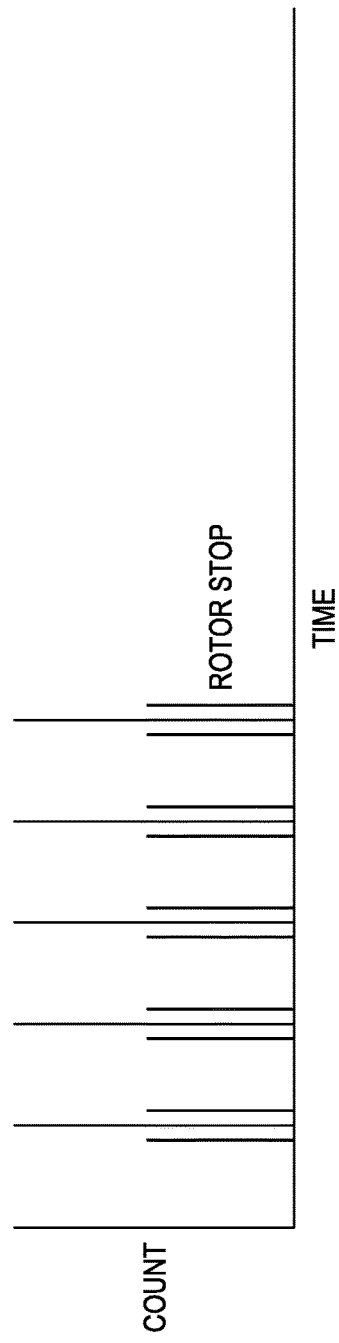

FIG. 17 is another example graph of example cycle counts for motor fault condition in the form of a rotor stop condition. As shown in FIG. 17, following a rotor stop event, the cycle count for the capacitive sensor 144A-H stops, possibly immediately, periodically increasing, and can be used to detect the rotor stop event. In some examples, slowing or increasing in speed can be determined or detected by measuring the time between peaks of the cycle count.

Figure 18:
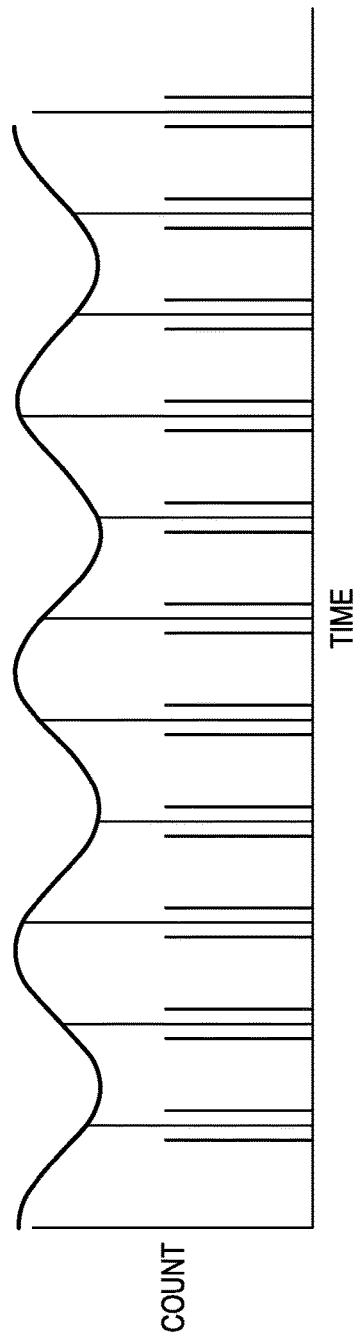

FIG. 18 is yet another example graph of example cycle counts for another example motor fault condition in the form of a rotor imbalance or wobble. As shown in FIG. 18, the rotor imbalance or wobble condition causes the periodic cycle count increase to vary in, for example amplitude. In some example, the cycle count variation is sinusoidal in nature.

FIG. 19 is a schematic diagram of an example charge-transfer sense circuit 1900 and an example count register 1902 for a capacitive sensor 1904, which may be used to implement the example sense circuits 160A-H and the example count registers 170A-H of FIG. 1. In FIG. 19, a resistor-capacitor (RC) network 1906 is used to charge a circuit voltage 1908. Charge is periodically transferred from the sense capacitor 1904 to the RC network 1906 by controlling example switches $SW_1$ and $SW_2$. When a conductor is proximate to the capacitive sensor 1904, the capacitance of the capacitive sensor 1904 increases, and more charge is transferred from the capacitive sensor 1904 to the RC network 1906 per cycle of the switches $SW_1$ and $SW_2$. By counting, with a counter 1910, the number of cycles of the switches $SW_1$ and $SW_2$ (e.g., number of cycles of a control signal 1912) needed for the circuit voltage 1908 to exceed a threshold voltage $V_{REF}$, a measure of the capacitance of the capacitive sensor 1904 can be determined.

The smaller the count stored in the count register 1902, the larger the capacitance of the capacitive sensor 1904, which indicates a larger interference of the capacitive sensor 1904 by a conductor. Thus, counts stored in the count registers 1902, 200A-H for respective ones of the sense circuits 1900, 160A-H can be used to determine which capacitive sensors 1904, 144A-H are in close(-st) proximity to a conductor, and, thus, to determine the angular position of the rotatable shaft 112 of the motor 110.

FIG. 20 is a schematic diagram of an example sigma-delta sense circuit 1900 and an example count register 2002 for a capacitive sensor 2004, which may be used to implement the example sense circuits 160A-H and the example count registers 170A-H of FIG. 1. In FIG. 20, the capacitive sensor 2004 charges a resistor-capacitor (RC) network 2006 that charges a circuit voltage 2008. When a conductor is proximate to the capacitive sensor 2004, the capacitance of the capacitive sensor 2004 increases, and charge is transferred faster from the capacitive sensor 2004 to the circuit voltage 2008. Once the circuit voltage 2008 exceeds a threshold reference voltage $V_{REF}$, a comparator 2012 is tripped, and discharge of the circuit voltage 2008 through a resistor 2014 begins. As the capacitance of the capacitive sensor 2004 increases, the discharging slows as charging by the capacitive sensor 2004 continues. By counting, with a counter 2016, the number of cycles of an output signal 2018 of an oscillator 2020 can be used to determine the capacitance of the capacitive sensor 2004.

The larger the count stored in the count register 2002, the larger the capacitance of the capacitive sensor 2004, which indicates a larger interference of the capacitive sensor 2004 by a conductor. Thus, counts stored in the count registers 2002, 200A-H for respective ones of the sense circuits 2000, 160A-H can be used to determine which capacitive sensors 2004, 144A-H are in close(-st) proximity to a conductor, and, thus, to determine the angular position of the rotatable shaft 112 of the motor 110.

Figure 21:
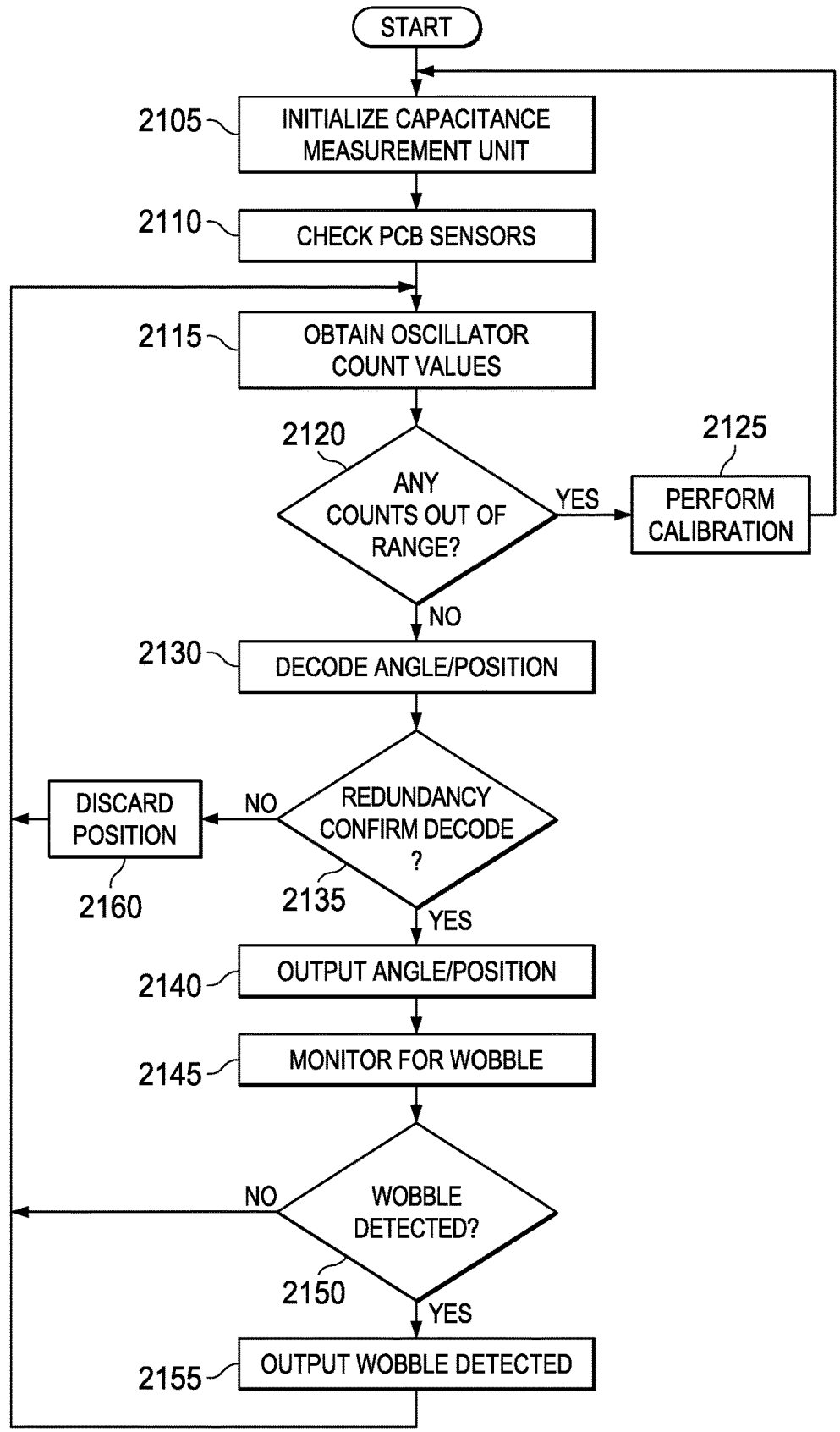
FIG. 21 is a flow diagram representing an example process that may be implemented as machine-readable instructions that may be executed to implement the example motor position sense assembly to determine the position of a rotatable shaft of a motor.

FIG. 21 is a flow diagram representative of example process(es) that may be implemented as coded computer-readable instructions, the coded instructions may be executed to implement the motor position sense assembly 120 to determine the angular position of the rotatable shaft 112 of the motor 110. In this example, the coded instructions comprise one or more programs for execution by a processor such as the processor 2212 shown in the example processor platform 2200 discussed below in connection with FIG. 22. The program(s) may be embodied in the coded instructions and stored on one or more tangible computer-readable storage mediums associated with the processor 2212. One or more of the program(s) and/or parts thereof could alternatively be executed by a device other than the processor 2212. One or more of the programs may be embodied in firmware or dedicated hardware. Further, although the example process(s) is/are described with reference to the flowchart illustrated in FIG. 21, many other methods of implementing the motor position sense assembly 120 may alternatively be used. For example, the order of execution of the blocks may be changed, and/or some of the blocks described may be changed, eliminated, or combined.

As mentioned above, the example process(es) of FIG. 21 may be implemented using coded instructions (e.g., computer-readable instructions and/or machine-readable instructions) stored on one or more tangible computer-readable storage mediums. As used herein, the term tangible computer-readable storage medium is expressly defined to include any type of computer-readable storage device and/or storage disk and to exclude propagating signals and to exclude transmission media. As used herein, "tangible computer-readable storage medium" and "tangible machine-readable storage medium" are used interchangeably. Additionally, or alternatively, the example process(es) of FIG. 21 may be implemented using coded instructions (e.g., computer-readable instructions and/or machine-readable instructions) stored on one or more non-transitory computer mediums. As used herein, the term non-transitory computer-readable storage medium is expressly defined to include any type of computer-readable storage device and/or storage disk and to exclude propagating signals and to exclude transmission media. As used herein, "non-transitory computer-readable storage medium" and "non-transitory machine-readable storage medium" are used interchangeably.

Example tangible computer-readable storage mediums include, but are not limited to, any tangible computer-readable storage device or tangible computer-readable storage disk such as a memory associated with a processor, a memory device, a flash drive, a digital versatile disk (DVD), a compact disc (CD), a Blu-ray disk, a floppy disk, a hard disk drive, a random access memory (RAM), a read-only memory (ROM), etc. and/or any other storage device or storage disk in which information is stored for any duration (e.g., for extended time periods, permanently, for brief instances, for temporarily buffering, and/or for caching of the information).

The example process of FIG. 21 includes the controller 180 initializing the sense circuits 160A-H (block 2105), and checking the capacitive sensors 144A-H for fault conditions, such as an open, a short, a high impedance state, etc. (block 2110). Such conditions can be identified, for example, by oscillation counts that are too high, too low, don't changes as the motor rotates, etc.

The controller 210 obtains the oscillation count values from the count registers 160A-H (block 2115) and, if any are out of bounds (block 2120), performs a calibration process on the capacitive sensors 144A-H and/or sense circuits 160A-H (block 2125). An example calibration process, for the example oscillator circuit 700 of FIG. 7, changes the threshold of the comparator 714 positive input, or resistance of a resistor 732 to move the output in the range, when the capacitance to digital counts conversion is out of the range. Control returns to block 2105 to re-initialize the sense circuits 160A-H.

If the oscillation counts are in range (block 2120), the oscillation counts are used to decode the angular position of the rotatable shaft 112 (block 2130). If redundancy information (if available) confirms the angular position (block 2135), the angular position is output and/or used for motor control, or other purposes (block 2140).

The oscillation counts are monitored for variations (block 2145). For example, an oscillation count is monitored for a variation, such as, an oscillation (e.g., a sinusoidal variation) in the maximum values of the oscillation count. If a wobble is detected (block 2150), a wobble detected indication is output (block 2155), and control returns to block 2115 to obtain new oscillation counts (block 2115).

Returning to block 2135, if the redundancy information does not confirm the angular position (block 2115), the decoded angular position is discarded (block 2160), and control returns to block 2115 to obtain new oscillation counts (block 2115).

Figure 22:
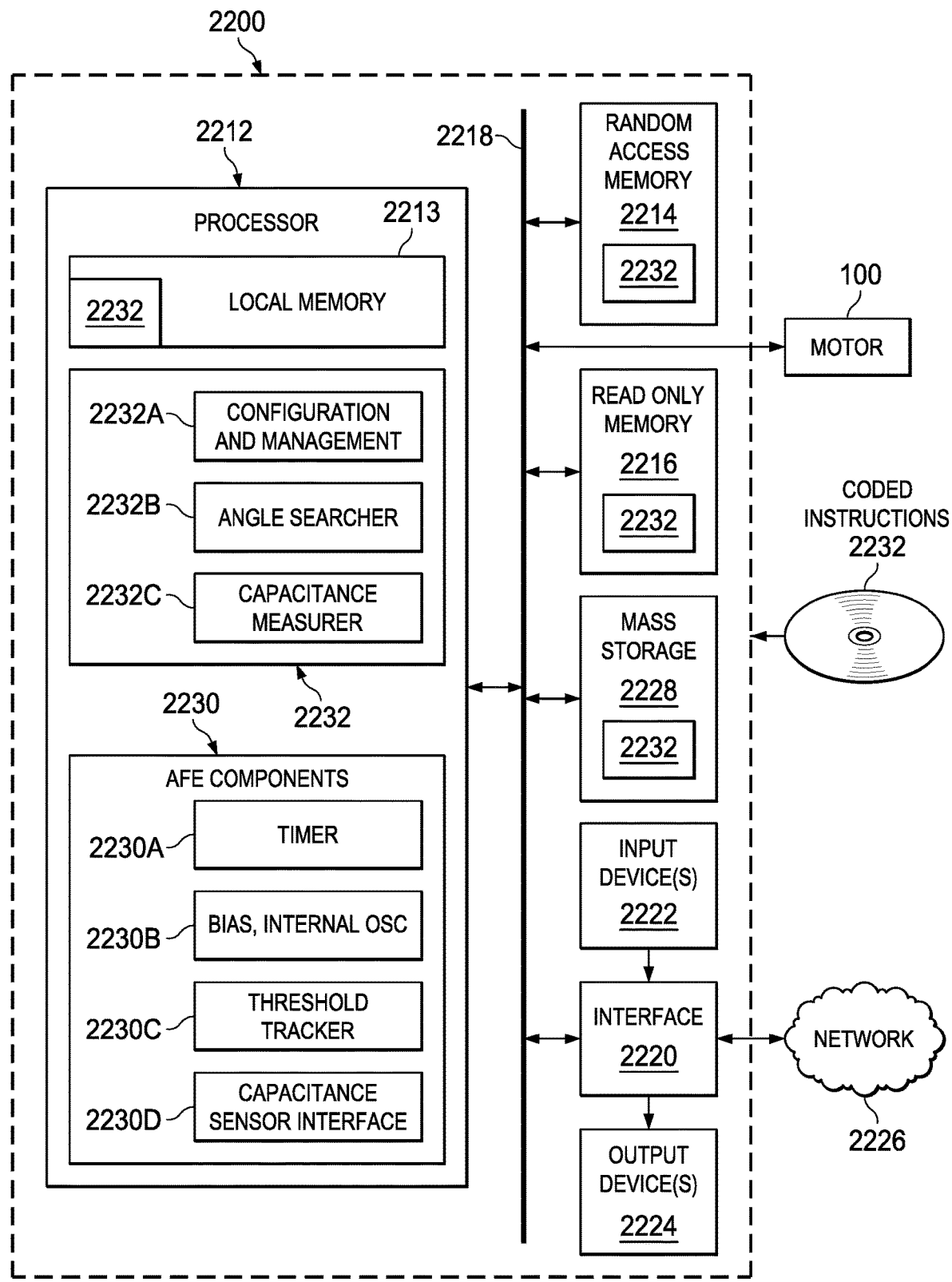
FIG. 22 illustrates an example processor system structured to execute the example instructions of FIG. 21 to implement the example motor position sense assemblies disclosed herein.

FIG. 22 is a block diagram of an example processor platform 2200 configured to execute the process(es) of FIG. 21 to implement the example motor position sense assembly 120 of FIGS. 1 and 2. The processor platform 2200 can be, for example, a server, a personal computer, or any other type of computing device.

The processor platform 2200 of the illustrated example includes a processor 2212. The processor 2212 of the illustrated example is hardware. For example, the processor 2212 can be implemented by one or more integrated circuits, logic circuits, microprocessors, GPUs, or controllers from any desired family or manufacturer.

The processor 2212 of the illustrated example includes a local memory 2213 (e.g., a cache). The processor 2212 of the illustrated example is in communication with a main memory including a volatile memory 2214 and a non-volatile memory 2216 via a bus 2218. The volatile memory 2214 may be implemented by Synchronous Dynamic Random Access Memory (SDRAM), Dynamic Random Access Memory (DRAM), RAMBUS Dynamic Random Access Memory (RDRAM) and/or any other type of random access memory (RAM) device. The non-volatile memory 2214 may be implemented by flash memory and/or any other desired type of memory device. Access to the main memory 2214, 2216 is controlled by a memory controller.

In the illustrated example, any one or more of the local memory 2213, the RAM 2214, the read only memory 2216, and/or a mass storage device 2228 may implement the example count registers 160A-H.

In some examples, the example processor 2212 communicates with the example motor 110 via the bus 2218, and/or another input/output interface (e.g., external IC pins).

The processor platform 2200 of the illustrated example also includes an interface circuit 2220. The interface circuit 2220 may be implemented by any type of interface standard, such as an Ethernet interface, a universal serial bus (USB), and/or a peripheral component interconnect (PCI) express interface.

In the illustrated example, one or more input devices 2222 are connected to the interface circuit 2220. The input device(s) 2222 permit(s) a user to enter data and commands into the processor 2212. The input device(s) can be implemented by, for example, an audio sensor, a microphone, a camera (still or video), a keyboard, a button, a mouse, a touchscreen, a track-pad, a trackball, isopoint and/or a voice recognition system. In some examples, the input devices 2222 implement all or a portion of the capacitive sensors 144A-H and/or the sense circuits 160A-H.

One or more output devices 2224 are also connected to the interface circuit 2220 of the illustrated example. The output devices 2224 can be implemented, for example, by display devices (e.g., a light emitting diode (LED), an organic light emitting diode (OLED), a liquid crystal display, a cathode ray tube display (CRT), a touchscreen, a tactile output device, a light emitting diode (LED), a printer and/or speakers). The interface circuit 2220 of the illustrated example, thus, typically includes a graphics driver card, a graphics driver chip or a graphics driver processor. In some examples, one or more output devices 2224 are used to control the motor 110.

In some examples, the processor 2212 includes analog front-end (AFE) components 2230 that enable the processor 2212 to control and/or receive inputs from the motor 110 and/or the motor position sense assembly 120. Example AFE components include, but are not limited to, an example timer 2230A to gate the storage of oscillations counts in the count registers 190A-H, bias and internal oscillator circuits 2230B, an example threshold tracker 2230C to monitor oscillator counts and adjust thresholds for determining whether an oscillator count is out of range, and a capacitive sensor interface 2230D for controlling and receiving information from the oscillator circuits 2230B.

The interface circuit 2220 of the illustrated example also includes a communication device such as a transmitter, a receiver, a transceiver, a modem and/or network interface card to facilitate exchange of data with external machines (e.g., computing devices of any kind) via a network 2226 (e.g., an Ethernet connection, a digital subscriber line (DSL), a telephone line, coaxial cable, a cellular telephone system, etc.).

The processor platform 2200 of the illustrated example also includes one or more mass storage devices 2228 for storing software and/or data. Examples of such mass storage devices 2228 include floppy disk drives, hard drive disks, compact disk drives, Blu-ray disk drives, RAID systems, and digital versatile disk (DVD) drives.

Coded instructions 2232 include the machine-readable instructions of FIG. 21 and may be stored in the mass storage device 2228, in the volatile memory 2214, in the non-volatile memory 2216, and/or on a removable tangible computer readable storage medium such as a CD or DVD. Example coded instructions include, but are not limited to, configuration and management functions 2232A to implement the overall control and operation of the motor 110, an angle searcher 2232B to determine the angular position of the rotatable shaft 112 from oscillation counts, and a capacitance measurer 2232C to determine capacitances by controlling an oscillator and a counter.

From the foregoing, it will be appreciated that methods, apparatus and articles of manufacture have been disclosed which enhance motor control operations by improving the accuracy and speed of determining the angular position of a rotatable shaft of a motor. Additional examples of which include, but are not limited to:

An example apparatus to determine a position of a rotatable shaft of a motor includes a sensor printed circuit board (PCB) structured to be mounted to a motor, the sensor PCB including a plurality of capacitive sensors, the plurality of capacitive sensors having respective ones of a plurality of capacitances that independently change as a conductor moves relative to the sensor PCB in conjunction with a rotatable shaft of the motor during an operation of the motor, and a controller electrically coupled to the sensor PCB, the controller configured to determine a position of the rotatable shaft based on the plurality of capacitances.

An example printed example circuit board (PCB) structured to be mounted to a motor includes a plurality of capacitive sensors, each of the capacitive sensors having a capacitor, the capacitor having a first terminal and a second terminal, the second terminal coupled to a ground terminal, a sense circuit coupled to the first terminal, the sense circuit having a signal having a frequency that depends on a capacitance of the capacitor, the capacitance responsive to a proximity of the capacitor to a conductor that rotates together with a rotatable shaft of the motor, a counter coupled to the signal to count cycles of the signal, and a controller to determine a position of the rotatable shaft of the motor based on a count of the cycles.

An example method of determining a fault condition of a rotatable shaft of a motor includes counting a plurality of cycle counts of respective ones of a plurality of sense circuits, each of the sense circuits having a signal having a respective cycle frequency based on a capacitance of a respective capacitive sensor, the capacitive sensors associated with one of a plurality of respective angular positions of a conductor that rotates in connection with the rotatable shaft, and determining a fault condition of the rotatable shaft based on a variation in the plurality of cycle counts.

An example tangible computer-readable storage medium including instructions that, when executed, cause a machine to perform at least counting a plurality of cycle counts of respective ones of a plurality of sense circuits, each of the sense circuits having a signal having a respective cycle frequency based on a capacitance of a respective capacitive sensor, the capacitive sensors associated with one of a plurality of respective angular positions of a conductor that rotates in connection with a rotatable shaft, and determining an angular position of the rotatable shaft based on the plurality of cycle counts An example motor assembly includes a motor having a rotatable shaft, a sensor printed circuit board (PCB) mounted to the motor, the sensor PCB including a plurality of capacitive sensors, the plurality of capacitive sensors having respective ones of a plurality of capacitances that change as a conductor moves relative to the sensor PCB during an operation of the motor, each of the plurality of capacitive sensors includes a conductive region formed on the sensor PCB, and a ground region formed on the sensor PCB, the ground region spaced apart from the conductive region to form, together with the conductive region, a capacitor, the capacitor forming the capacitance of the capacitive sensor, a plurality of sense circuits for respective ones of the plurality of capacitive sensors, each of the sense circuits having a signal having a cycle frequency based on the capacitance of the respective capacitive sensor. A controller mounted to the sensor PCB, the controller configured to count cycles of the plurality of signals for respective ones of the plurality of capacitive sensors, and to determine a position of the rotatable shaft based on the capacitive sensor having the largest respective count, and a conductor PCB mounted to the rotatable shaft, the conductor PCB rotating in connection with the rotatable shaft, the conductor PCB including the conductor that changes the plurality of capacitances as the rotatable shaft rotates during the operation of the motor.

In this specification and the appended claims, the singular forms "a," "an" and "the" do not exclude the plural reference unless the context clearly dictates otherwise. Further, conjunctions such as "and," "or," and "and/or" are inclusive unless the context clearly dictates otherwise. For example, "A and/or B" includes A alone, B alone, and A with B. Further, as used herein, when the phrase "at least" is used in this specification and/or as the transition term in a preamble of a claim, it is open-ended in the same manner as the term "comprising" is open ended.

Further, connecting lines or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the embodiments disclosed herein unless the element is specifically described as "essential" or "critical".

Terms such as, but not limited to, approximately, substantially, generally, etc. are used herein to indicate that a precise value or range thereof is not required and need not be specified. As used herein, the terms discussed above will have ready and instant meaning to one of ordinary skill in the art.

Although certain example methods, apparatuses and articles of manufacture have been described herein, the scope of coverage of this patent is not limited thereto. It is to be understood that terminology employed herein is for the purpose of describing particular aspects, and is not intended to be limiting. On the contrary, this patent covers all methods, apparatus and articles of manufacture fairly falling within the scope of the claims of this patent.

What is claimed is:

1. An apparatus comprising:
a capacitive sensor configured to detect a capacitance value associated with a conductor;
a counter coupled to the capacitive sensor, wherein the counter is configured to determine a count value associated with the capacitance value; and
a controller coupled to the counter, wherein the controller is configured to determine a characteristic based on the count value, wherein:
the capacitive sensor includes a first switch and a second switch coupled to a resistor-capacitor (RC) network;
the first switch and the second switch are configured to transfer a charge to the RC network; and
the counter is configured to count a number of cycles in which the first switch and the second switch transfer the charge to the RC network.

2. The apparatus of claim 1, wherein:
the characteristic includes one or more of an angular position, a stop condition, and a balance condition.

3. The apparatus of claim 2, wherein:
the angular position is determined based on the count value corresponding to a largest capacitance value.

4. The apparatus of claim 2, wherein:
the stop condition is determined based on the count value not changing over a period of time.

5. The apparatus of claim 2, wherein:
the balance condition is determined based on a variation in the count value over a period of time.

6. The apparatus of claim 1, further comprising:
a count register coupled to the counter, wherein the count register is configured to store the count value.

7. The apparatus of claim 1, wherein:
the capacitive sensor includes a comparator configured to compare the capacitance value with a reference;
an output signal of the comparator oscillates; and
the counter is configured to count oscillations of the output signal.

8. An apparatus comprising:
a capacitive sensor configured to detect a capacitance value associated with a conductor;
a counter coupled to the capacitive sensor, wherein the counter is configured to determine a count value associated with the capacitance value; and
a controller coupled to the counter, wherein the controller is configured to determine a characteristic based on the count value, wherein:
the capacitive sensor includes a resistor-capacitor (RC) network configured to have a voltage charged at a rate based on the capacitance value;
a comparator is configured to compare the voltage on the RC network with a reference voltage;
an output of the comparator configures the RC network to discharge over a period of time; and
the counter is configured to count a number of cycles of an oscillator during the period of time.

9. The apparatus of claim 8, wherein:
the characteristic includes one or more of an angular position, a stop condition, and a balance condition.

10. The apparatus of claim 9, wherein:
the angular position is determined based on the count value corresponding to a largest capacitance value.

11. The apparatus of claim 9, wherein:
the stop condition is determined based on the count value not changing over a period of time.

12. The apparatus of claim 9, wherein:
the balance condition is determined based on a variation in the count value over a period of time.

13. The apparatus of claim 8, further comprising:
a count register coupled to the counter, wherein the count register is configured to store the count value.

14. The apparatus of claim 8, wherein:
the capacitive sensor includes a comparator configured to compare the capacitance value with a reference;
an output signal of the comparator oscillates; and
the counter is configured to count oscillations of the output signal.

15. A method comprising:
detecting, by a capacitive sensor, a capacitance value associated with a conductor;
determining, by a counter, a count value associated with the capacitance value;
determining, by a controller, a characteristic based on the count value, wherein the count value is a first count value;
decoding, by the controller, the count value to determine an angular position;
decoding, by the controller, the first count value to determine a first angular position;
decoding, by the controller, a second count value to determine a second angular position;
comparing, by the controller, the first angular position with the second angular position; and
in response to the second angular position not validating the first angular position: obtaining, by the controller, a third angular position and a fourth angular position; comparing, by the controller, the third angular position with the fourth angular position; and in response to the fourth angular position validating the third angular position, outputting, by the controller, the third angular position.

16. The method of claim 15, further comprising:
initializing, by the controller, the capacitive sensor.

17. The method of claim 15, further comprising:
determining, by the controller, a fault condition of the capacitive sensor based on the count value.

18. The method of claim 17, wherein:
the fault condition includes an open condition, a short condition, and a high impedance state.

19. The method of claim 15, further comprising:
calibrating, by the controller, the capacitive sensor in response to the count value outside a threshold.

20. The method of claim 15, wherein:
further comprising:
determining, by the counter, a second count value; and
determining, by the controller, a wobble condition based on a difference in the first count value and the second count value.

21. An apparatus comprising:
a capacitive sensor configured to detect a capacitance value associated with a conductor;
a counter coupled to the capacitive sensor, wherein the counter is configured to determine a count value associated with the capacitance value; and
a controller coupled to the counter, wherein the controller is configured to determine a characteristic based on the count value, and wherein: the capacitive sensor includes a plurality of sensing regions; and the count value includes a plurality of individual count values, wherein each of the plurality of individual count values is associated with a respective one of the plurality of sensing regions, further wherein:
the conductor is a first conductor;
a first sensing region of the plurality of sensing regions is configured to detect a first capacitance value associated with the first conductor based on a first count value of the plurality of individual count values;
a second sensing region of the plurality of sensing regions is configured to detect a second capacitance value associated with a second conductor based on a second count value of the plurality of individual count values; and
the controller is configured to determine the characteristic based on either the first count value or the second count value.

22. The apparatus of claim 21, wherein:
the characteristic includes one or more of an angular position, a stop condition, and a balance condition.

23. The apparatus of claim 22, wherein:
the angular position is determined based on the count value corresponding to a largest capacitance value.

24. The apparatus of claim 22, wherein:
the stop condition is determined based on the count value not changing over a period of time.

25. The apparatus of claim 22, wherein:
the balance condition is determined based on a variation in the count value over a period of time.

26. The apparatus of claim 21, further comprising:
a count register coupled to the counter, wherein the count register is configured to store the count value.

27. The apparatus of claim 21, wherein:
the capacitive sensor includes a comparator configured to compare the capacitance value with a reference;
an output signal of the comparator oscillates; and
the counter is configured to count oscillations of the output signal.

* * * * *